United States Patent
Mitchell et al.

(10) Patent No.: US 11,430,613 B2
(45) Date of Patent: Aug. 30, 2022

(54) RECYCLABLE DRY-PARTICLE BASED ADHESIVE ELECTRODE AND METHODS OF MAKING SAME

(75) Inventors: Porter Mitchell, San Diego, CA (US); Xiaomei Xi, Carlsbad, CA (US); Linda Zhong, San Diego, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 12/042,935

(22) Filed: Mar. 5, 2008

(65) Prior Publication Data

US 2008/0206446 A1 Aug. 28, 2008

Related U.S. Application Data

(62) Division of application No. 10/817,074, filed on Apr. 2, 2004, now Pat. No. 7,342,770.

(60) Provisional application No. 60/546,093, filed on Feb. 19, 2004, provisional application No. 60/511,273, filed on Oct. 14, 2003, provisional application No. 60/498,210, filed on Aug. 26, 2003, provisional application No. 60/498,346, filed on Aug. 26, 2003, provisional application No. 60/486,530, filed on Jul. 10, 2003, provisional application No. 60/486,002, filed on Jul. 9, 2003.

(51) Int. Cl.
| | |
|---|---|
| *H01G 9/00* | (2006.01) |
| *H01G 11/38* | (2013.01) |
| *H01G 11/86* | (2013.01) |
| *H01G 11/28* | (2013.01) |

(52) U.S. Cl.
CPC .............. *H01G 9/00* (2013.01); *H01G 11/28* (2013.01); *H01G 11/38* (2013.01); *H01G 11/86* (2013.01); *Y02E 60/13* (2013.01)

(58) Field of Classification Search
CPC ......... H01G 2009/0404; H01G 9/0525; H01G 2009/0408; H01G 9/155; H01G 9/00; H01G 11/28; H01G 11/38; H01G 11/86; Y02E 70/40; Y02E 60/13; H01M 4/00; H01M 4/0404; H01M 4/01; H01M 4/30; H01M 4/043; H01M 4/0433; H01M 4/0435
USPC ....... 427/115, 345, 189, 190, 191, 192, 197, 427/198, 201, 202, 203, 89, 80, 113, 79; 361/311, 312, 313, 502
See application file for complete search history.

(56) References Cited

U.S. PATENT DOCUMENTS

| | | |
|---|---|---|
| 2,692,210 A | 10/1954 | Burnham |
| 3,528,955 A | 9/1970 | Lippman et al. |
| 3,864,124 A | 2/1975 | Breton et al. |
| 4,129,633 A | 12/1978 | Biddick |

(Continued)

FOREIGN PATENT DOCUMENTS

| | | |
|---|---|---|
| EP | 0617441 A1 | 9/1994 |
| EP | 1009058 A1 | 6/2000 |

(Continued)

OTHER PUBLICATIONS

Office Action in U.S. Appl. No. 11/251,512 dated May 14, 2010 (13 pages).

(Continued)

*Primary Examiner* — Tabassom Tadayyon Eslami
(74) *Attorney, Agent, or Firm* — Knobbe, Martens, Olson & Bear, LLP

(57) ABSTRACT

A dry process based capacitor and method for using one or more recyclable electrode film structure is disclosed.

29 Claims, 28 Drawing Sheets

(56) References Cited

U.S. PATENT DOCUMENTS

| | | | |
|---|---|---|---|
| 4,153,661 A | 5/1979 | Ree et al. | |
| 4,175,055 A | 11/1979 | Goller et al. | |
| 4,177,159 A | 12/1979 | Singer | |
| 4,194,040 A | 3/1980 | Breton et al. | |
| 4,287,232 A | 9/1981 | Goller et al. | |
| 4,313,972 A | 2/1982 | Goller et al. | |
| 4,317,789 A | 3/1982 | Groult et al. | |
| 4,320,184 A | 3/1982 | Bernstein et al. | |
| 4,320,185 A | 3/1982 | Bernstein et al. | |
| 4,336,217 A | 6/1982 | Sauer | |
| 4,354,958 A | 10/1982 | Solomon | |
| 4,379,772 A | 4/1983 | Solomon et al. | |
| 4,383,010 A | 5/1983 | Spaepen | |
| 4,482,931 A | 11/1984 | Yializis | |
| 4,500,647 A | 2/1985 | Solomon et al. | |
| 4,556,618 A | 12/1985 | Shia | |
| 4,737,889 A | 4/1988 | Nishino et al. | |
| 4,758,473 A | 7/1988 | Herscovici et al. | |
| 4,822,701 A | 4/1989 | Ballard et al. | |
| 4,877,694 A | 10/1989 | Solomon et al. | |
| 4,895,775 A | 1/1990 | Kato et al. | |
| 4,917,309 A | 4/1990 | Zander et al. | |
| 4,992,910 A | 2/1991 | Evans | |
| 5,064,735 A | 11/1991 | Rampel et al. | |
| 5,100,747 A | 3/1992 | Hayashida et al. | |
| 5,136,474 A | 8/1992 | Sarangapani et al. | |
| 5,144,595 A | 9/1992 | Graham et al. | |
| 5,150,283 A | 9/1992 | Yoshida et al. | |
| 5,162,178 A | 11/1992 | Ohsawa et al. | |
| 5,168,019 A | 12/1992 | Sugeno | |
| 5,198,313 A | 3/1993 | Juergens | |
| 5,214,564 A | 5/1993 | Metzler et al. | |
| 5,381,303 A | 1/1995 | Yoshida et al. | |
| 5,393,617 A | 2/1995 | Klein | |
| 5,436,093 A | 7/1995 | Huang et al. | |
| 5,450,279 A | 9/1995 | Yoshida et al. | |
| 5,456,000 A | 10/1995 | Gozdz et al. | |
| 5,470,357 A | 11/1995 | Schmutz et al. | |
| 5,478,363 A | 12/1995 | Klein | |
| 5,478,668 A | 12/1995 | Gozdz et al. | |
| 5,482,906 A | 1/1996 | Sakai et al. | |
| 5,557,497 A | 9/1996 | Ivanov et al. | |
| 5,593,462 A | 1/1997 | Gueguen et al. | |
| 5,621,607 A | 4/1997 | Farahmandi et al. | |
| 5,636,437 A | 6/1997 | Kaschmittler et al. | |
| 5,675,553 A | 10/1997 | O'Brien et al. | |
| 5,677,082 A * | 10/1997 | Greinke et al. | 429/312 |
| 5,682,288 A | 10/1997 | Wani | |
| 5,698,342 A | 12/1997 | Klein | |
| 5,703,906 A | 12/1997 | O'Brien et al. | |
| 5,706,165 A | 1/1998 | Saito et al. | |
| 5,707,763 A | 1/1998 | Schmizu et al. | |
| 5,720,780 A | 2/1998 | Liu et al. | |
| 5,757,675 A | 5/1998 | O'Brien | |
| 5,778,515 A | 7/1998 | Menon | |
| 5,781,460 A | 7/1998 | Nguyen et al. | |
| 5,786,555 A | 7/1998 | Saito et al. | |
| 5,786,980 A | 7/1998 | Evans | |
| 5,840,087 A | 11/1998 | Gozdz et al. | |
| 5,846,675 A | 12/1998 | Sazhin et al. | |
| 5,849,431 A | 12/1998 | Kita et al. | |
| 5,879,836 A | 3/1999 | Ikeda et al. | |
| 5,914,019 A | 6/1999 | Dodgson et al. | |
| 5,955,215 A | 9/1999 | Kurzweil et al. | |
| 5,966,414 A | 10/1999 | O'Brien | |
| 5,973,912 A | 10/1999 | Kibi et al. | |
| 6,022,436 A | 2/2000 | Koslow et al. | |
| 6,024,773 A | 2/2000 | Inuzuka et al. | |
| 6,031,712 A | 2/2000 | Kurihara et al. | |
| 6,045,769 A * | 4/2000 | Kambe et al. | 423/447.3 |
| 6,066,440 A * | 5/2000 | Araki et al. | 430/354 |
| 6,072,692 A | 6/2000 | Hiratsuka et al. | |
| 6,094,338 A | 7/2000 | Hirahara et al. | |
| 6,110,335 A | 8/2000 | Avarbz et al. | |
| 6,114,835 A | 9/2000 | Price | |
| 6,127,474 A * | 10/2000 | Andelman | 524/495 |
| 6,134,760 A | 10/2000 | Mushiake et al. | |
| 6,159,611 A | 12/2000 | Lee et al. | |
| 6,181,545 B1 | 1/2001 | Amatucci et al. | |
| 6,187,061 B1 | 2/2001 | Amatucci et al. | |
| 6,207,251 B1 | 3/2001 | Balsimo et al. | |
| 6,222,715 B1 | 4/2001 | Gruhn | |
| 6,225,733 B1 | 5/2001 | Gadkaree et al. | |
| 6,236,560 B1 | 5/2001 | Ikeda et al. | |
| 6,238,818 B1 | 5/2001 | Dalton | |
| 6,245,464 B1 | 6/2001 | Spillman et al. | |
| 6,259,595 B1 | 7/2001 | Hebei et al. | |
| 6,262,360 B1 | 7/2001 | Michel | |
| 6,301,092 B1 | 10/2001 | Hata et al. | |
| 6,304,426 B1 | 10/2001 | Wei et al. | |
| 6,308,405 B1 | 10/2001 | Takamatasu et al. | |
| 6,310,756 B1 | 10/2001 | Miura et al. | |
| 6,310,759 B2 | 10/2001 | Ishigaki et al. | |
| 6,310,762 B1 | 10/2001 | Okamura et al. | |
| 6,323,750 B1 | 11/2001 | Lampl et al. | |
| 6,349,027 B1 | 2/2002 | Suhara et al. | |
| 6,359,769 B1 | 3/2002 | Mushiake et al. | |
| 6,377,441 B1 | 4/2002 | Ohya et al. | |
| 6,397,274 B1 | 5/2002 | Miller | |
| 6,403,257 B1 | 6/2002 | Christain et al. | |
| 6,424,514 B1 | 7/2002 | Boy et al. | |
| 6,447,669 B1 | 9/2002 | Lain | |
| 6,452,782 B1 | 9/2002 | Otsuki et al. | |
| 6,459,564 B1 | 10/2002 | Watannabe et al. | |
| 6,466,516 B1 | 10/2002 | O'Brien et al. | |
| 6,493,210 B2 | 12/2002 | Nonaka et al. | |
| 6,558,835 B1 | 5/2003 | Kurisu et al. | |
| 6,582,545 B1 | 6/2003 | Thiebolt, III et al. | |
| 6,589,299 B2 | 7/2003 | Missling et al. | |
| 6,614,646 B2 | 9/2003 | Bogaki et al. | |
| 6,627,252 B1 | 9/2003 | Nanjundiah et al. | |
| 6,627,337 B2 * | 9/2003 | Gan et al. | 429/9 |
| 6,645,664 B2 | 11/2003 | Nakanishi et al. | |
| 6,677,078 B2 | 1/2004 | Reise et al. | |
| 6,697,249 B2 | 2/2004 | Maletin et al. | |
| 6,708,757 B2 | 3/2004 | Hebel et al. | |
| 6,761,744 B1 | 7/2004 | Tsukamoto et al. | |
| 6,768,056 B2 | 7/2004 | Fischer et al. | |
| 6,795,297 B2 | 9/2004 | Iwaida et al. | |
| 6,808,845 B1 | 10/2004 | Nonaka et al. | |
| 6,804,108 B2 | 12/2004 | Nanjundiah et al. | |
| 6,831,826 B2 | 12/2004 | Iwaida et al. | |
| 6,847,517 B2 | 1/2005 | Iwaida et al. | |
| 6,887,617 B2 | 5/2005 | Sato et al. | |
| 6,906,911 B2 | 6/2005 | Ikeda et al. | |
| 6,912,116 B2 | 6/2005 | Takahashi et al. | |
| 6,914,768 B2 | 7/2005 | Matsumoto et al. | |
| 6,918,991 B2 | 7/2005 | Chickering | |
| 6,841,594 B2 | 11/2005 | Jones et al. | |
| 7,018,568 B2 | 3/2006 | Tierney | |
| 7,061,749 B2 | 6/2006 | Liu et al. | |
| 7,090,946 B2 | 8/2006 | Mitchell et al. | |
| 7,139,162 B2 | 11/2006 | Michel et al. | |
| 7,199,997 B1 | 4/2007 | Lipka et al. | |
| 7,227,737 B2 | 6/2007 | Mitchell et al. | |
| 7,236,348 B2 | 6/2007 | Asamp et al. | |
| 7,295,423 B1 | 11/2007 | Mitchell et al. | |
| 2001/0014420 A1 | 8/2001 | Takeuchi et al. | |
| 2002/0008956 A1 | 1/2002 | Niu | |
| 2002/0039275 A1 | 4/2002 | Takeuchi et al. | |
| 2002/0096661 A1 | 7/2002 | Shinozaki et al. | |
| 2002/0122985 A1 | 9/2002 | Sato et al. | |
| 2002/0136948 A1 | 9/2002 | Missling et al. | |
| 2002/0150812 A1 | 10/2002 | Kaz et al. | |
| 2002/0163773 A1 | 11/2002 | Niiori et al. | |
| 2002/0167784 A1 | 11/2002 | Takatomi et al. | |
| 2002/0167785 A1 | 11/2002 | Kamath | |
| 2002/0177027 A1 * | 11/2002 | Yeager | H01M 8/0221 252/511 |
| 2002/0181186 A1 * | 12/2002 | Bogaki et al. | 361/502 |
| 2002/0191370 A1 | 12/2002 | Matsuoka et al. | |
| 2003/0030963 A1 | 2/2003 | Tennent et al. | |
| 2003/0113636 A1 | 6/2003 | Sano et al. | |
| 2003/0157314 A1 | 8/2003 | Penneau et al. | |

(56) References Cited

U.S. PATENT DOCUMENTS

| | | |
|---|---|---|
| 2003/0175494 A1 | 9/2003 | Penneau et al. |
| 2003/0180622 A1 | 9/2003 | Tsukuda et al. |
| 2003/0186110 A1 | 10/2003 | Sloop |
| 2004/0130853 A1* | 7/2004 | Oyama ............ H01G 9/016 361/503 |
| 2005/0064289 A1 | 3/2005 | Suzuki et al. |
| 2005/0078432 A1 | 4/2005 | Gallay et al. |
| 2005/0186473 A1 | 8/2005 | Mitchell et al. |
| 2005/0225929 A1 | 10/2005 | Murakami et al. |
| 2005/0250011 A1 | 11/2005 | Mitchell et al. |
| 2005/0266298 A1 | 12/2005 | Mitchell et al. |
| 2005/0266990 A1 | 12/2005 | Iwasaki et al. |
| 2005/0271798 A1 | 12/2005 | Zhong et al. |
| 2006/0035785 A1 | 2/2006 | Tanaka |
| 2006/0039100 A1 | 2/2006 | Asano et al. |
| 2006/0054277 A1 | 3/2006 | Byun et al. |
| 2006/0105624 A1 | 5/2006 | Yoshikane et al. |
| 2006/0109608 A1 | 5/2006 | Zhong et al. |
| 2006/0114643 A1 | 6/2006 | Mitchell et al. |
| 2006/0133012 A1 | 6/2006 | Zhong et al. |
| 2006/0133013 A1 | 6/2006 | Xi et al. |
| 2006/0137158 A1 | 6/2006 | Zou et al. |
| 2006/0143884 A1 | 7/2006 | Mitchell et al. |
| 2006/0146475 A1 | 7/2006 | Zhong et al. |
| 2006/0146479 A1 | 7/2006 | Mitchell et al. |
| 2006/0147712 A1 | 7/2006 | Mitchell et al. |
| 2006/0148191 A1 | 7/2006 | Mitchell et al. |
| 2006/0246343 A1 | 11/2006 | Mitchell et al. |
| 2007/0026317 A1 | 2/2007 | Mitchell et al. |
| 2007/0122698 A1 | 5/2007 | Mitchell et al. |
| 2007/0177334 A1 | 8/2007 | Thrap |
| 2007/0184711 A1 | 8/2007 | Thrap et al. |
| 2007/0190424 A1 | 8/2007 | Mitchell et al. |
| 2008/0092808 A1 | 4/2008 | Mitchell et al. |
| 2008/0102371 A1 | 5/2008 | Mitchell et al. |
| 2008/0117564 A1 | 5/2008 | Zhong et al. |

FOREIGN PATENT DOCUMENTS

| | | | |
|---|---|---|---|
| EP | 1126536 | | 8/2001 |
| JP | 01241811 A | | 9/1989 |
| JP | 04-067610 | | 3/1992 |
| JP | 04-088619 | | 3/1992 |
| JP | 05-129020 | | 5/1993 |
| JP | 08-096810 | | 4/1996 |
| JP | 09-183604 | | 7/1997 |
| JP | 10-284052 | * | 10/1998 |
| JP | 410284050 | * | 10/1998 |
| JP | 0948076 | * | 10/1999 |
| JP | 2000-200737 | | 7/2000 |
| JP | 2000-279777 | * | 10/2000 |
| KR | 2001/066099 | * | 7/2001 |
| KR | 2001066099 | | 12/2005 |
| WO | 2001/071739 | * | 9/2001 |
| WO | WO 02/065563 A1 | | 8/2002 |

OTHER PUBLICATIONS

Office Action in U.S. Appl. No. 11/251,512 dated Oct. 7, 2010 (13 pages).

European Office Action for European Application No. 04756866.2-1227 dated Oct. 18, 2011.

Billmeyer, Fred W., "Textbook of polymer science" 152-153 (Wiley Interscience, 2$^{nd}$ Ed., 1971).

National Institute for Occupational Safety and Health, Perfluoroisobutylene, International Chemical Safety Card (1994), https://www.cdc.gov/niosh/ipcsneng/neng1216.html.

* cited by examiner

Dry Powder Resistance

Effects on Rdn

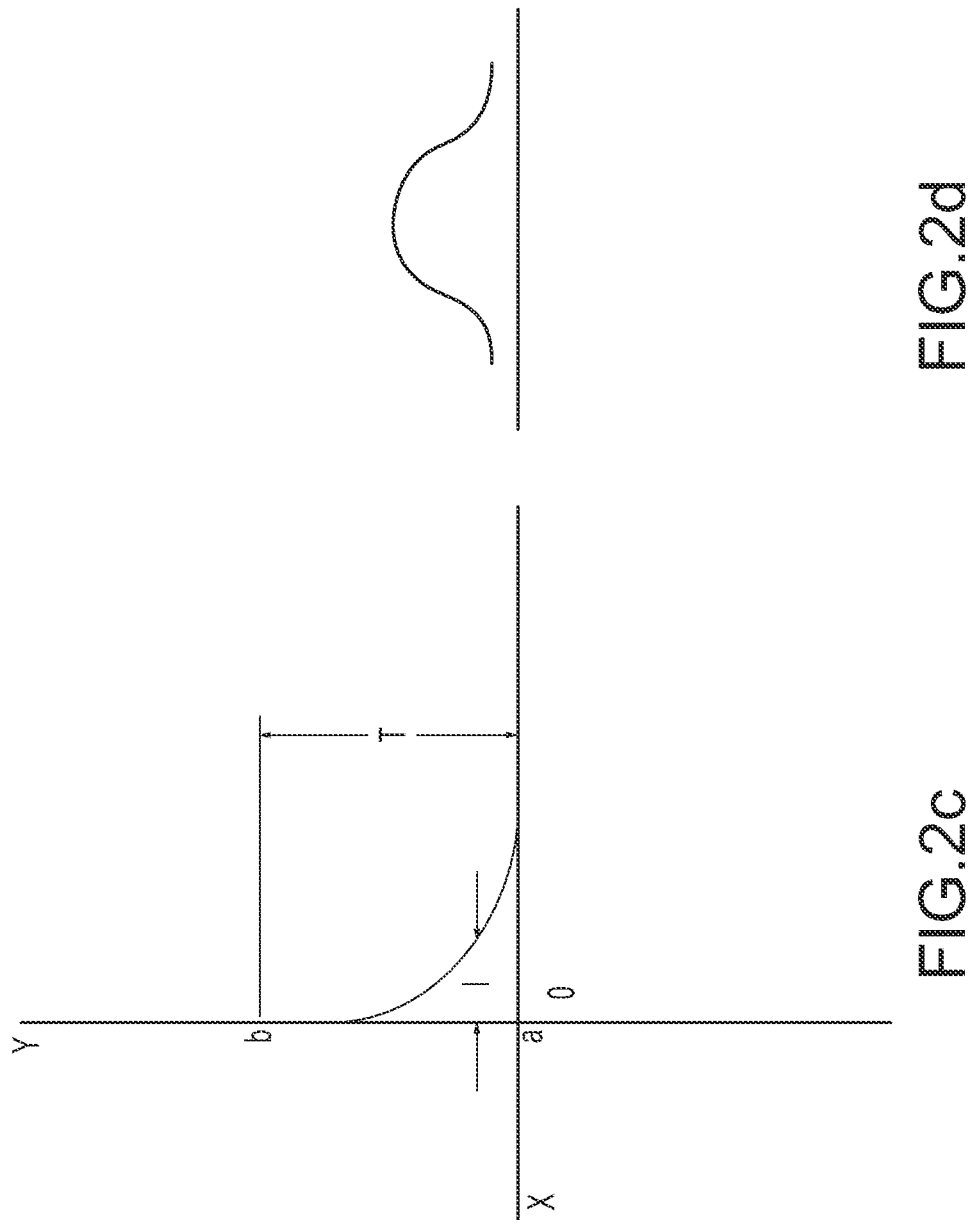

RECYCLABLE DRY-PARTICLE BASED ADHESIVE ELECTRODE AND METHODS OF MAKING SAME

CROSS-REFERENCE TO RELATED APPLICATIONS

The present invention is a divisional of U.S. application Ser. No. 10/817,074, filed Apr. 2, 2004, entitled "Recyclable Dry-Particle Based Adhesive Electrode and Methods of Making Same" which claims priority from commonly assigned Provisional Application No. 60/486,002, filed Jul. 9, 2003; commonly assigned Provisional Application No. 60/486,530, filed Jul. 10, 2003; commonly assigned Provisional Application No. 60/498,346, filed Aug. 26, 2003; commonly assigned Provisional Application No. 60/498,210, filed Aug. 26, 2003; commonly assigned Provisional Application No. 60/511,273, filed Oct. 14, 2003; and commonly assigned Provisional Application No. 60/546,093, filed Feb. 19, 2004. Each of these nonprovisional and provisional applications is incorporated herein by reference in their entirety.

FIELD OF THE INVENTION

The present invention relates generally to the field of energy storage devices that are used to power modern technology. More particularly, the present invention relates to recyclable structures and methods for making dry particle based adhesive electrode films for use in capacitor products.

BACKGROUND INFORMATION

Devices that are used to power modern technology are numerous. Inclusive of such devices are capacitors, batteries, and fuel cells. With each type of device are associated positive and negative characteristics. Based on these characteristics decisions are made as to which device is more suitable for use in a particular application. Overall cost of a device is an important characteristic that can make or break a decision as to whether a particular type of device is used. Double-layer capacitors, also referred to as ultracapacitors and super-capacitors, are energy storage devices that are able to store more energy per unit weight and unit volume than capacitors made with traditional technology.

Double-layer capacitors store electrostatic energy in a polarized electrode/electrolyte interface layer. Double-layer capacitors include two electrodes, which are separated from contact by a porous separator. The separator prevents an electronic (as opposed to an ionic) current from shorting the two electrodes. Both the electrodes and the porous separator are immersed in an electrolyte, which allows flow of the ionic current between the electrodes and through the separator. At the electrode/electrolyte interface, a first layer of solvent dipole and a second layer of charged species is formed (hence, the name "double-layer" capacitor).

Although, double-layer capacitors can theoretically be operated at voltages as high as 4.0 volts and possibly higher, current double-layer capacitor manufacturing technologies limit nominal operating voltages of double-layer capacitors to about 2.5 to 2.7 volts. Higher operating voltages are possible, but at such voltages undesirable destructive breakdown begins to occur, which in part may be due to interactions with impurities and residues that can be introduced into, or attach themselves to, electrodes during manufacture. For example, undesirable destructive breakdown of double-layer capacitors is seen to appear at voltages between about 2.7 to 3.0 volts.

Known capacitor electrode fabrication techniques utilize processing additive based coating and/or extrusion processes. Both processes utilize binders, which typically comprise polymers or resins that provide cohesion between structures used to make the capacitor. Known double-layer capacitors utilize electrode film and adhesive/binder layer formulations that have in common the use of one or more added processing additive (also referred throughout as "additive"), variations of which are known to those skilled in the arts as solvents, lubricants, liquids, plasticizers, and the like. When such additives are utilized in the manufacture of a capacitor product, the operating lifetime, as well maximum operating voltage, of a final capacitor product may become reduced, typically because of undesirable chemical interactions that can occur between residues of the additive(s) and a subsequently used capacitor electrolyte.

In a coating process, an additive (typically organic, aqueous, or blends of aqueous and organic solvents) is used to dissolve binders within a resulting wet slurry. The wet slurry is coated onto a collector through a doctor blade or a slot die. The slurry is subsequently dried to remove the solvent. With prior art coating based processes, as layer thickness decreases, it becomes increasingly more difficult to achieve an even homogeneous layer, for example, wherein a uniform 5 micron thick coating of an adhesive/binder layer is desired. The process of coating also entails high-cost and complicated processes. Furthermore, coating processes require large capital investments, as well as high quality control to achieve a desired thickness, uniformity, top to bottom registration, and the like.

In the prior art, a first wet slurry layer is coated onto a current collector to provide the current collector with adhesive/binder layer functionality. A second slurry layer, with properties that provide functionality of a conductive electrode layer, may be coated onto the first coated layer. In another prior art example, an extruded layer can be applied to the first coated layer to provide conductive electrode layer functionality.

In the prior art process of forming an extruded conductive electrode layer, binder and carbon particles are blended together with one or more additive. The resulting material has dough-like properties that allow the material to be introduced into an extruder apparatus. The extruder apparatus fibrillates the binder and provides an extruded film, which is subsequently dried to remove most, but as discussed below, typically not all of the additive(s). When fibrillated, the binder acts as a matrix to support the carbon particles. The extruded film may be calendared many times to produce an electrode film of desired thickness and density.

Known methods for attaching additive/solvent based extruded electrode films and/or coated slurries to a current collector include the aforementioned precoating of a slurry of adhesive/binder. Pre-coated slurry layers of adhesive/binder are used in the capacitor prior arts to promote electrical and physical contact with current collectors, and the current collectors themselves provide a physical electrical contact point.

Impurities can be introduced or attach themselves during the aforementioned coating and/or extrusion processes, as well as during prior and subsequent steps. Just as with additives, the residues of impurities can reduce a capacitor's operating lifetime and maximum operating voltage. In order to reduce the amount of additive and impurity in a final capacitor product, one or more of the various prior art capacitor structures described above are processed through a dryer. Drying processes introduce many manufacturing steps, as well as additional processing apparatus. In the prior art, the need to provide adequate throughput requires that the drying time be limited to on the order of hours, or less. However, with such short drying times, sufficient removal of additive and impurity is difficult to achieve. Even with a long drying time (on the order of days) the amounts of remaining additive and impurity is still measurable, especially if the additives or impurities have a high heat of absorption. Long dwell times limit production throughput and increase production and process equipment costs. Residues of the additives and impurities remain in commercially available capacitor products and can be measured to be on the order of many parts-per-million.

Binder particles used in prior art additive based fibrillization steps include polymers and polymer-like substances. Polymers and similar ultra-high molecular weight substances capable of fibrillization are commonly referred to as "fibrillizable binders" or "fibril-forming binders." Fibril-forming binders find use with powder like materials. In one prior art process, fibrillizable binder and powder materials are mixed with solvent, lubricant, or the like, and the resulting wet mixture is subjected to high-shear forces to fibrillize the binder particles. Fibrillization of the binder particles produces fibrils that eventually form a matrix or lattice for supporting a resulting composition of matter. In the prior art, the high shear forces can be provided by subjecting the wet mixture comprising the binder to an extrusion process.

In the prior art, the resulting additive based extruded product can be subsequently processed in a high-pressure compactor, dried to remove the additive, shaped into a needed form, and otherwise processed to obtain an end-product for a needed application. For purposes of handling, processing, and durability, desirable properties of the end product typically depend on the consistency and homogeneity of the composition of matter from which the product is made, with good consistency and homogeneity being important requirements. Such desirable properties depend on the degree of fibrillization of the polymer. Tensile strength commonly depends on both the degree of fibrillization of the fibrillizable binder, and the consistency of the fibril lattice formed by the binder within the material. When used as an electrode film, internal resistance of an end product is also important. Internal resistance may depend on bulk resistivity—volume resistivity on large scale—of the material from which the electrode film is fabricated. Bulk resistivity of the material is a function of the material's homogeneity; the better the dispersal of the conductive carbon particles or other conductive filler within the material, the lower the resistivity of the material. When electrode films are used in capacitors, such as, electrochemical double-layer capacitors, capacitance per unit volume is yet another important characteristic for consideration. In double layer capacitors, capacitance increases with the specific surface area of the electrode film used to make a capacitor electrode. Specific surface area is defined as the ratio of (1) the surface area of electrode film exposed to an electrolytic solution when the electrode material is immersed in the solution, and (2) the volume of the electrode film. An electrode film's specific surface area and capacitance per unit volume are believed to improve with improvement in consistency and homogeneity.

In both the coating and extrusion processes, once an electrode film is created, if a problem arises or is found to have occurred during a process step, the film is typically discarded.

A need thus exists for new methods of producing inexpensive and reliable capacitor electrode materials with one or more of the following qualities: improved consistency and homogeneity of distribution of binder and active particles on microscopic and macroscopic scales; improved tensile strength of electrode film produced from the materials; decreased resistivity; and increased specific surface area. Yet another need exists for capacitor electrodes fabricated from recycled materials with these qualities. A further need is to provide capacitors and capacitor electrodes without the use of processing additives.

SUMMARY

The present invention provides a high yield method for making inexpensive, durable, and highly reliable dry electrode films and associated structures for use in energy storage devices.

In one embodiment, an energy storage device product comprises a mix of recyclable carbon and binder particles. At least some of the mix may be dry fibrillized. The mix may comprise no processing additive.

In one embodiment, an energy storage device product, may comprise a film, the film including a mix of particles, wherein at least some of the particles are recycled particles. The particles may be fibrillized. The recycled particles may be fibrillized. The film may be a self-supporting film. The film may comprise a thickness of less than 250 microns. The film may comprise a length of at least 1 meter. The film may be coupled directly against a substrate. The film may comprise substantially no processing additive. The substrate may comprise a collector. The product may comprise a collector, and wherein the film is coupled directly against a surface of the collector. The collector may comprise two sides, wherein one film is calendered directly against one side of the collector, wherein a second film is calendered directly against a second side of the collector. The collector may be treated. The collector may be formed to comprise a roll. The roll may be disposed within a sealed aluminum housing. The product of claim 4, wherein at least some of the particles comprise fibrillizable fluoropolymer and carbon particles. The carbon particles comprise activated carbon particles and conductive particles. At least some of the particles may comprise thermoplastic particles.

In one embodiment, an energy storage product, may comprise a dry mix of recyclable dry binder and dry carbon particles, the particles formed into a continuous self-supporting electrode film without the substantial use of any processing additives. The processing additive not used may include hydrocarbons, high boiling point solvents, antifoaming agents, surfactants, dispersion aids, water, pyrrolidone, mineral spirits, ketones, naphtha, acetates, alcohols, glycols, toluene, xylene, and Isopars™. At least some of the dry binder may comprise a fibrillized dry binder. The binder may be fibrillized by a high-pressure gas. The high-pressure may comprise a pressure of more than 60 PSI. The gas may comprise a water content of less than about 20 PPM.

In one embodiment, a method of making an energy storage device electrode comprises the steps of forming an electrode film from a plurality of particles; and reusing one or more of the plurality of particles to form the film. The plurality of particles may be dry fibrillized. The method may comprise a step of coupling a first side of the film to a collector. The step of reusing may comprise a step of fibrillizing the particles after the particles are used to make the electrode film. The binder may comprise a fluoropolymer. The carbon particles may comprise conductive carbon particles. The film may be self supporting. The particles may comprise conductive carbon particles and activated carbon particles. The film may be a heated dry film. The film may comprise a density of about 0.50 to 0.70 gm/cm$^3$. The method may comprise between about 80% to 95% activated carbon, between about 0% to 15% conductive carbon, and between about 3% to 15% fibrillizable fluoropolymer. The film may comprise a thermoplastic.

In one embodiment, a capacitor comprises a plurality of dry processed particles, the dry processed particles including recycled binder and conductive particles. At least some of the dry processed particles may be formed as a self supporting dry electrode film. The capacitor may comprise a current collector, wherein the dry processed particles are bonded to the current collector, wherein the current collector comprises aluminum. The capacitor may comprise separator, wherein the dry processed particles are bonded to the separator. The separator may comprise paper. The capacitor may be rated to operate at a maximum voltage of 3.0 volts or less. The dry electrode film may comprise a density of about 0.50 to 0.70 gm/cm$^3$. The dry processed particles may be compacted into a dry self-supporting electrode film by a single pass compaction device. The capacitor may comprise a sealed aluminum housing, wherein the dry processed particles are disposed within the housing. The capacitor may comprise a sealed aluminum housing, wherein the current collector is coupled to the housing by a laser weld. The capacitor may comprise a jellyroll type electrode.

In one embodiment, a capacitor comprises a plurality of reusable particles; a collector; the collector having two sides; and two electrode film layers, the two electrode film layers comprised of the reusable particles, wherein a first electrode film layer is bonded directly onto a first surface of the collector, and wherein a second electrode film layer is bonded directly onto a second surface of the collector. The two electrode film layers may comprise substantially no processing additives. The two electrode layers may comprise dry fibrillized particles. The film layers may comprise substantially zero residues as determined by a chemical analysis of the layers before impregnation by an electrolyte. The energy storage device may comprise one or more continuous self supporting intermixed film structure comprised of reused carbon particles dry binder particles, the film structure consisting of about zero parts per million processing additive. The additive may be selected from hydrocarbons, high boiling point solvents, antifoaming agents, surfactants, dispersion aids, water, pyrrolidone, mineral spirits, ketones, naphtha, acetates, alcohols, glycols, toluene, xylene, and Isopars™. The intermixed film structure may be an electrode film. The electrode film may be an energy storage device electrode film. The electrode film may comprise a capacitor electrode film.

In one embodiment, an energy storage device comprises a housing; a collector, the collector having an exposed surface; an electrolyte, the electrolyte disposed within the housing; and an electrode film, the electrode comprised of recycled particles, wherein the electrode film is impregnated with the electrolyte, and wherein the electrode film is coupled directly to the exposed surface. The electrode film may be substantially insoluble in the electrolyte. The electrode may comprise a dry binder, wherein the binder is substantially insoluble in the electrolyte. The binder may comprise a thermoplastic, wherein the thermoplastic couples the electrode film to the collector. The electrolyte may be an acetonitrile type of electrolyte.

In one embodiment, an energy storage device structure comprises one or more recyclable electrode film, wherein the one or more recyclable electrode film is both conductive and adhesive, and wherein the one or more recyclable electrode film is coupled directly to a current collector.

In one embodiment, an energy storage device structure comprises one or more self-supporting recyclable dry process based electrode film. The film may comprise conductive and adhesive particles. The adhesive particles may comprise a thermoplastic. The electrode may be a capacitor electrode.

In one embodiment, an electrode comprises a collector; and a dry process based electrode film, wherein the electrode film is coupled to the collector, wherein the electrode film comprises conductive particles and binder particles, and wherein between the collector and the electrode film there exists only one distinct interface. The binder particles may comprise a thermoplastic. The conductive particles may comprise conductive carbon. The electrode film may comprise activated carbon. The conductive particles may comprise a metal.

In one embodiment, an energy storage device structure comprises a plurality of intermixed recyclable dry processed carbon and binder particles formed as an electrode, wherein as compared to an electrode formed of a plurality of the same carbon and binder particles processed with a processing additive, the intermixed dry processed carbon and binder particles comprises less residue.

In one embodiment, a capacitor comprises a continuous compacted self supporting recyclable dry electrode film comprised of a dry mix of dry binder and dry carbon particles, the film coupled to a collector, the collector shaped into a roll disposed within a sealed aluminum housing. The dry electrode film may comprise substantially no processing additive.

In one embodiment, an energy storage device comprises dry process recyclable electrode means for providing electrode functionality in an energy storage device.

In one embodiment, a solventless method for manufacture of an energy storage device electrode comprises the steps of providing dry carbon particles; providing dry binder particles; and forming the dry carbon and dry binder particles into an energy storage device electrode without the substantial use of any hydrocarbons, high boiling point solvents, antifoaming agents, surfactants, dispersion aids, water, pyrrolidone mineral spirits, ketones, naphtha, acetates, alcohols, glycols, toluene, xylene, and/or Isopars™. In one embodiment, an energy storage device electrode comprises substantial no hydrocarbons, high boiling point solvents, antifoaming agents, surfactants, dispersion aids, water, pyrrolidone mineral spirits, ketones, naphtha, acetates, alcohols, glycols, toluene, xylene, and/or Isopars™.

Other embodiments, benefits, and advantages will become apparent upon a further reading of the following Figures, Description, and Claims.

BRIEF DESCRIPTION OF THE DRAWINGS

FIG. 2c shows a gradient of particles within a dry film.

FIG. 2d shows a distribution of the sizes of dry binder and conductive carbon particles.

DESCRIPTION OF THE PREFERRED EMBODIMENTS

Figure 1A:
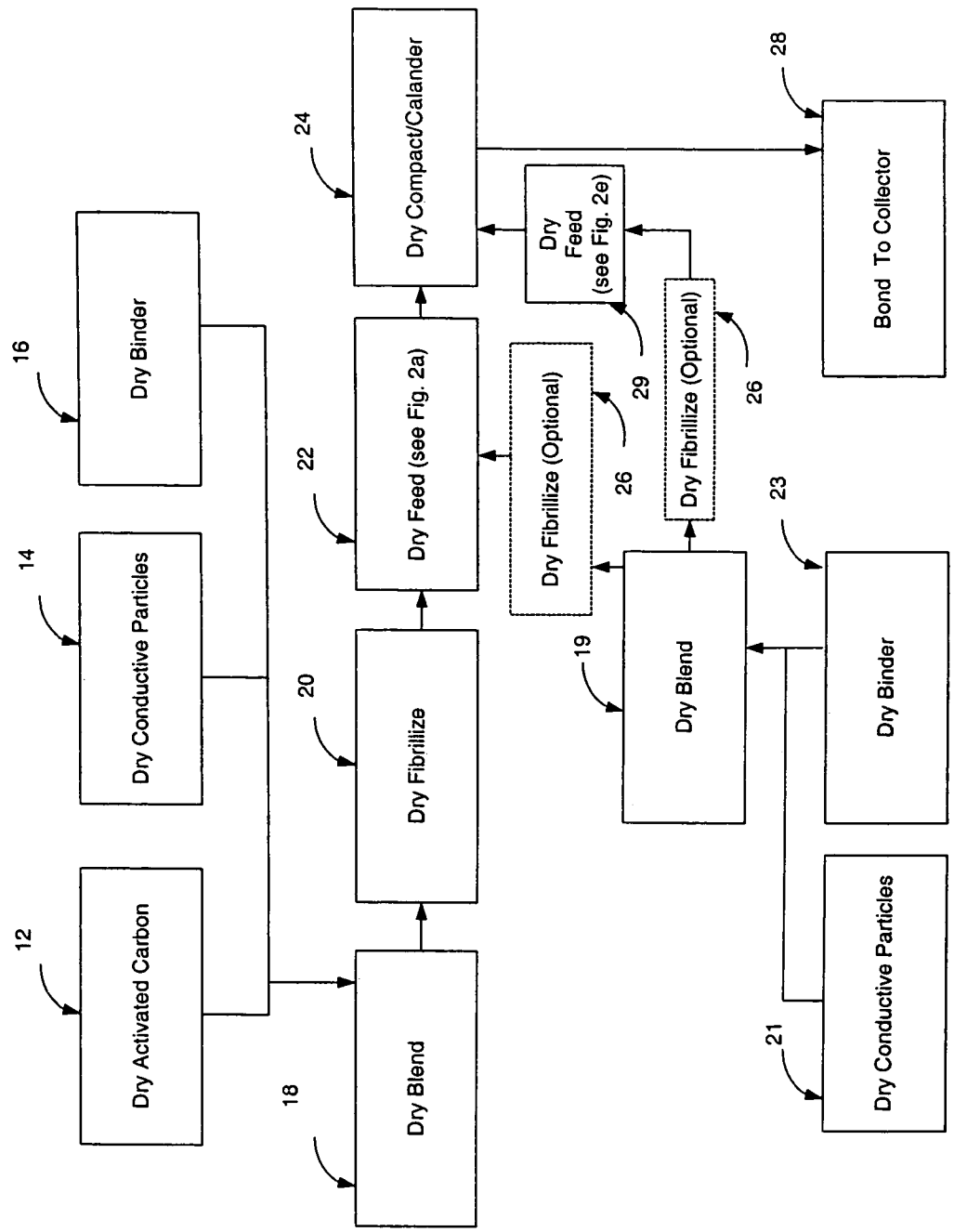
FIG. 1*a* is a block diagram illustrating a method for making an energy storage device electrode film.

Reference will now be made in detail to several embodiments of the invention that are illustrated in the accompanying drawings. Wherever possible, same or similar reference numerals are used to refer to the same or similar elements, or steps and/or elements used therein.

In accordance with embodiments of the present invention, an inexpensive, long lasting, reliable dry particle capacitor, capacitor electrode, and one or more recycled/recyclable structures thereof, as well as methods for making the same are described. The present invention provides distinct advantages when compared to those of the additive-based coating/extruder devices of the prior art, which include the ability to utilize structures that, if needed, can be reused.

The energy storage devices and methods associated with the present invention do not use the one or more prior art processing aides or additives associated with coating and extrusion based processes (hereafter referred throughout as "processing additive" or "additive"), including: added solvents, liquids, lubricants, plasticizers, and the like. As well, one or more associated additive removal steps, post coating treatments such as curing or cross-linking, drying step(s) and apparatus associated therewith, and the like, are eliminated. Because additives are not used during manufacture, a final electrode product is not subject to chemical interactions that may occur between the aforementioned prior art residues of such additives and a subsequently used electrolyte. Because binders that are dissolvable by additives do not need to be used with present invention, a wider class of or selection of binders may be used than in the prior art. Such binders can be selected to be completely or substantially insoluble and nonswellable in typically used electrolytes, an advantage, which when combined with a lack of additive based impurities or residues such electrolytes can react to, allows that a much more reliable and durable energy storage device may be provided. A high throughput method for making more durable and more reliable energy storage devices is thus provided.

Figure 7A:
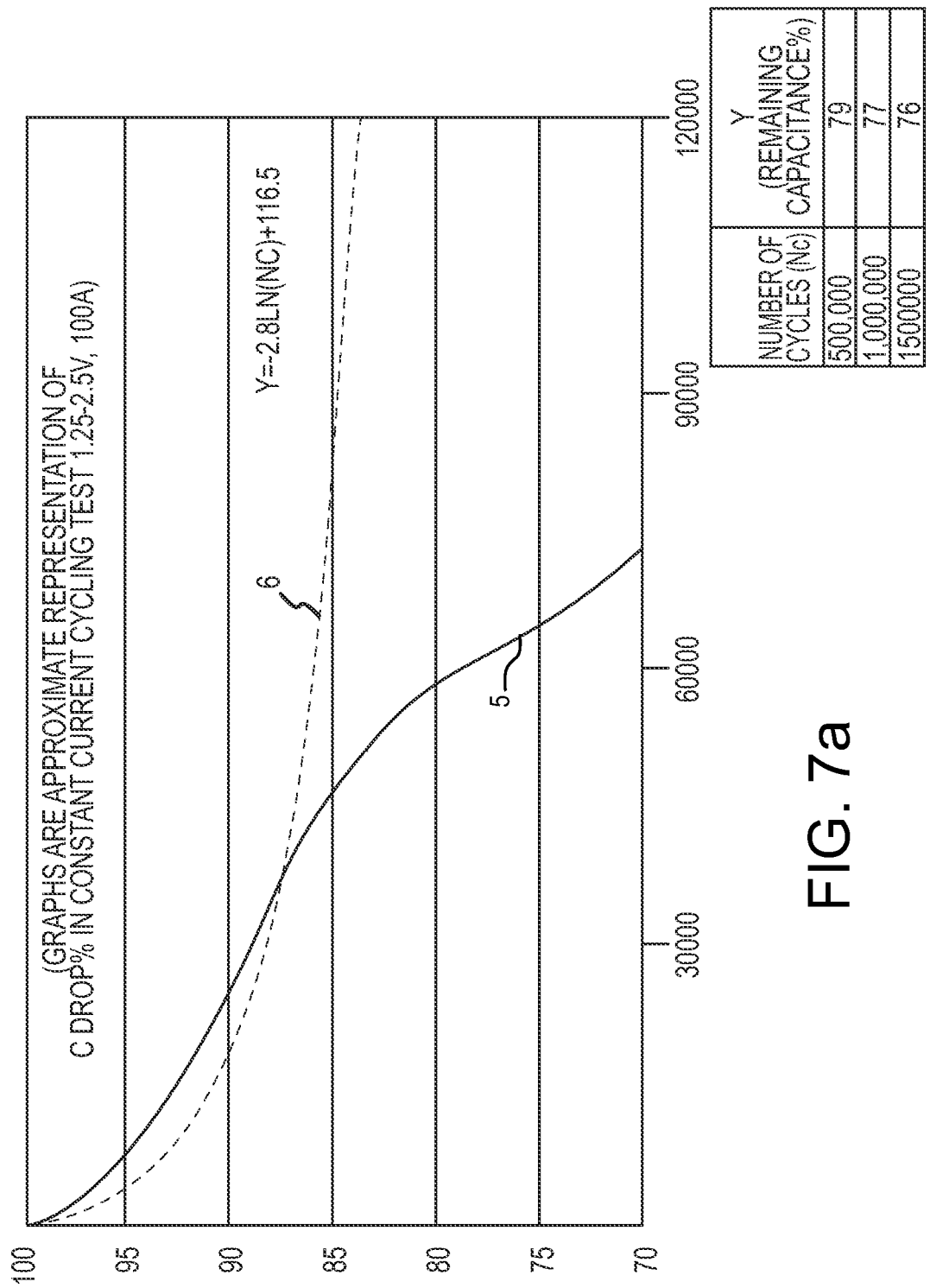
FIG. 7a illustrates capacitance vs. number of full charge/discharge charge cycles.

Referring now to FIG. 7a, there are seen capacitance vs. number of full charge/discharge charge cycles tests for both a prior art energy storage device 5 manufactured using processing additives and an embodiment of an energy storage device 6 comprising structures manufactured using no processing additives according to one or more of the principles described further herein.

Device 5 incorporates in its design a prior art processing additive-based electrode available from W.L Gore & Associates, Inc. 401 Airport Rd., Elkton, Md. 21922, 410-392-444, under the EXCELLERATOR™ brand of electrode. The EXCELLERATOR™ brand of electrode was configured in a jellyroll configuration within an aluminum housing to comprise a double-layer capacitor. Device 6 was also configured as a similar Farad double-layer capacitor in a similar form factor housing, but using instead a dry electrode film 33 (as referenced in FIG. 2g described below).

The dry electrode film 33 was adhered to a collector by an adhesive coating sold under the trade name Electrodag® EB-012 by Acheson Colloids Company, 1600 Washington Ave., Port Huron, Mich. 48060, Telephone 1-800-984-5581. Dry film 33 was manufactured utilizing no processing additives in a manner described further herein.

Those skilled in the art will identify that high capacitance (for example, 1000 Farads and above) capacitor products that are sold commercially are derated to reflect an initial drop (on the order of 10% or so) in capacitance that may occur during the first 5000 or so capacitor charge discharge cycles, in other words, a rated 2600 Farad capacitor sold commercially may initially be a 2900 Farad or higher rated capacitor. After the first 5000 cycles or so, those skilled in the art will identify that under normal expected use, (normal temperature, average cycle discharge duty cycle, etc), a capacitors rated capacitance may decrease at a predictable reduced rate, which may be used to predict a capacitors useful life. The higher the initial capacitor value needed to achieve a rated capacitor value, the more capacitor material is needed, and thus, the higher the cost of the capacitor.

Figure 7B:
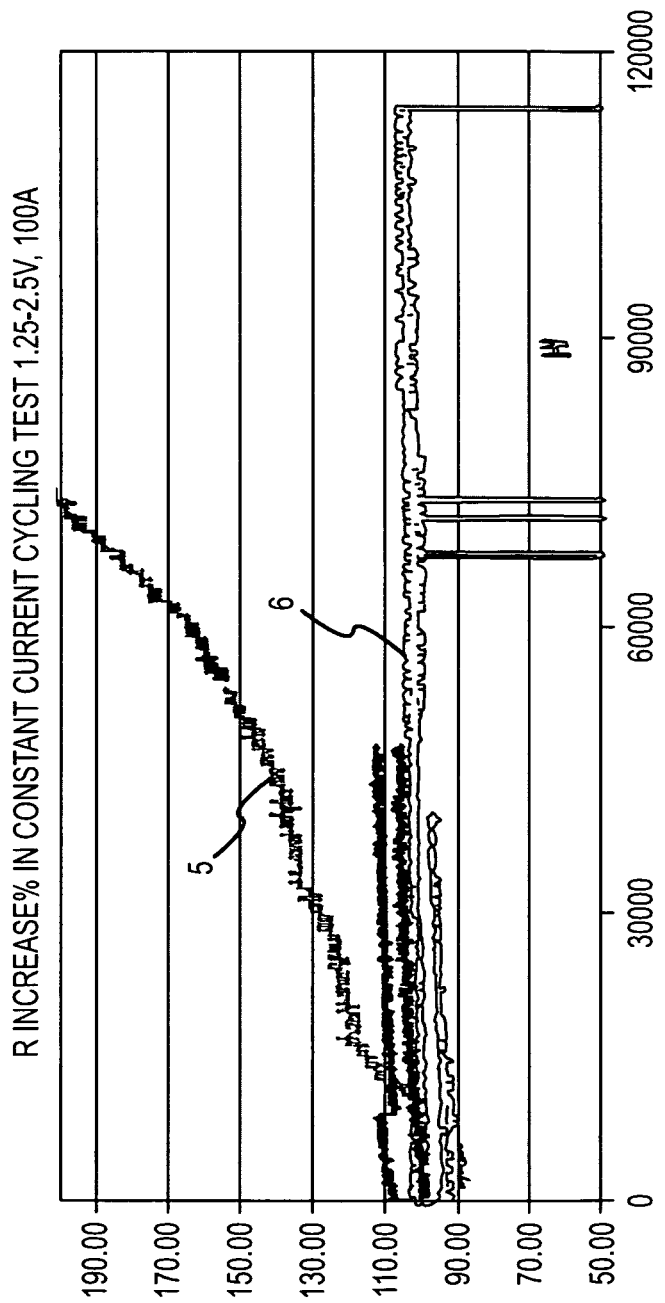
FIG. 7b illustrates resistance vs. number of full charge/discharge charge cycles.

In the FIGS. 7a and 7b embodiments, both devices 5 and 6 were tested without any preconditioning. The initial starting capacitance of devices 5 and 6 was about 2800 Farad. The test conditions were such that at room temperature, both devices 5 and 6 were full cycle charged at 100 amps to 2.5 volts and then discharged to 1.25 volts. Both devices were charged and discharged in this manner continuously. The test was performed for approximately 70,000 cycles for the prior art device 5, and for approximately 120,000 cycles for the device 6. Those skilled in the art will identify that such test conditions are considered to be high stress conditions that capacitor products are not typically expected to be subject to, but were nevertheless conducted to demonstrate the durability of device 6. As indicated by the results, the prior art device 5 experienced a drop of about 30% in capacitance by the time 70,000 full charge cycles occurred, whereas at 70,000 and 120,000 cycles device 6 experienced only a drop of about 15% and 16%, respectively. Device 6 is shown to experience a predictable decrease in capacitance that can be modeled to indicate that cycling of the capacitor up to about 0.5 million, 1 million, and 1.5 million cycles can be achieved under the specific conditions with respective drops of 21%, 23%, and 24% in capacitance. At 70,000 cycles it is shown that device 6 made according to one or more of the embodiments disclosed herein experienced about 50% less in capacitance drop than a processing additive based prior art device 5 (about 15% vs. 30%, respectively). At about 120,000 cycles it is shown that device 6 made according to one or more embodiments disclosed herein experienced only about 17% capacitance drop. At 1 million cycles it is envisioned that device 6 will experience less than 25% drop from its initial capacitance.

Referring now to FIG. 7b, there are seen resistance vs. number of full charge/discharge charge cycles tests for both a prior art energy storage device 5 manufactured using processing additives and an embodiment of an energy storage device 6. As indicated by the results, the prior art device 5 experienced an increase in resistance over that of device 6. As seen, device 6 experiences a minimal increase in resistance (less than 10% over 100,000 cycles) as compared to device 5 (100% increase over 75,000 cycles).

Figure 7C:
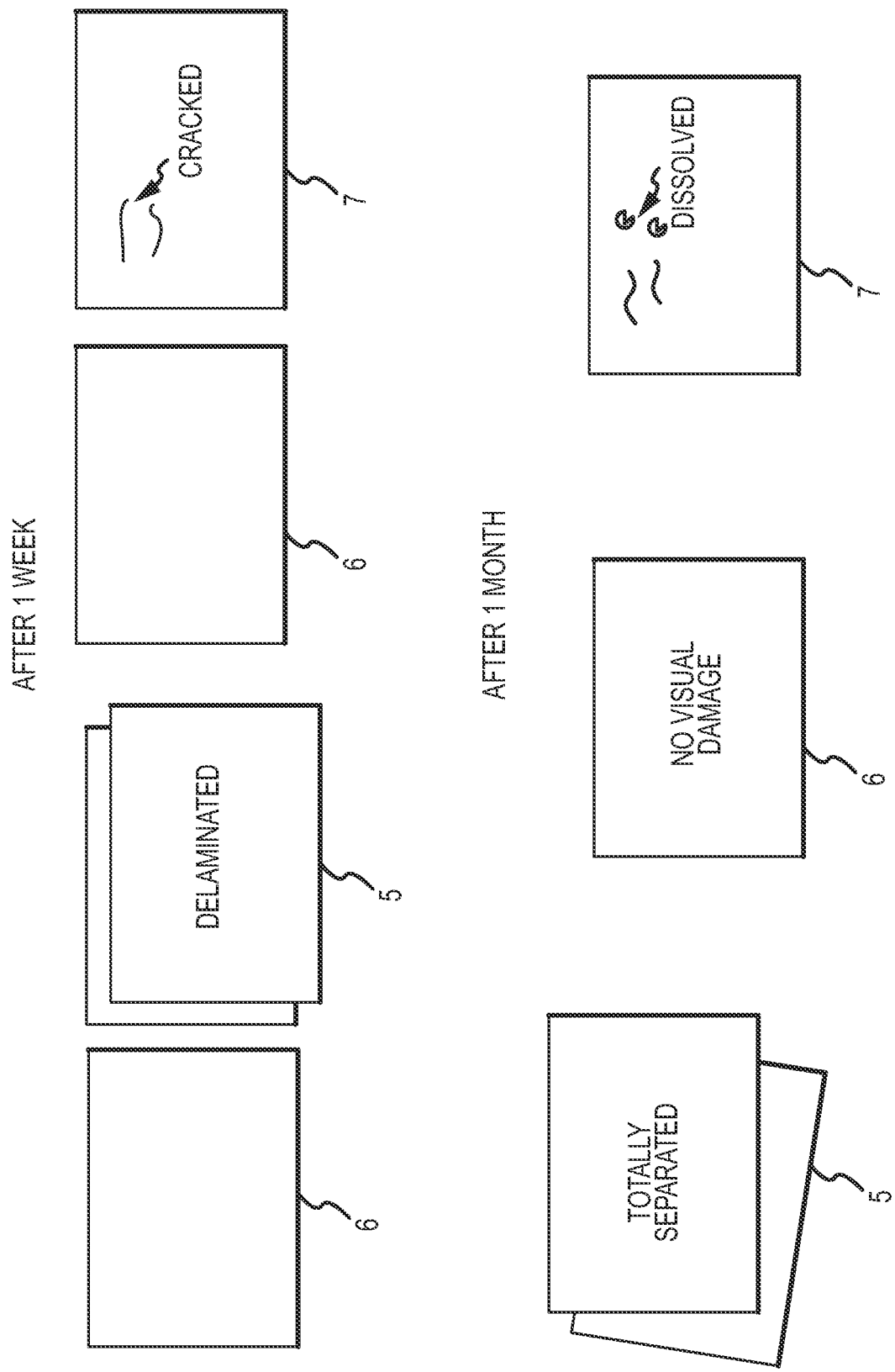
FIG. 7c illustrates effects of electrolyte on specimens of electrodes.

Referring now to FIG. 7c, there are seen physical specimens of electrode obtained from devices 5, 6, and 7 shown after one week and 1 month of immersion in 1.5 M tetramethylammonium or tetrafluoroborate in acetonitrile electrolyte at a temperature of 85 degrees centigrade. The electrode sample from device 5 comprises the processing additive based EXCELLERATOR™ brand of electrode film discussed above, and the electrode sample of device 7 comprises a processing additive based electrode film obtained from a 5 Farad NESCAP double-layer capacitor product, Wonchun-Dong 29-9, Paldal-Ku, Suwon, Kyonggi, 442-380, Korea, Telephone: +82 31 219 0682. As seen, electrodes from devices 5 and 7 show damage after 1 week and substantial damage after 1 month immersion in acetonitrile electrolyte. In contrast, an electrode from a device 6 made of one or more of the embodiments described further herein shows no visual damage, even after one year (physical specimen not shown) of immersion in acetonitrile electrolyte.

Accordingly, in one embodiment, when charged at 100 amps to 2.5 volts and then discharged to 1.25 volts over 120,000 cycles a device 6 experiences less than a 30 percent drop in capacitance. In one embodiment, when charged at 100 amps to 2.5 volts and then discharged to 1.25 volts over 70,000 cycles a device 6 experiences less than a 30 percent drop in capacitance. In one embodiment, when charged at 100 amps to 2.5 volts and then discharged to 1.25 volts over 70,000 cycles a device 6 experiences less than a 5 percent drop in capacitance. In one embodiment, a device 6 is capable of being charged at 100 amps to 2.5 volts and then discharged to 1.25 volts over 1,000,000 cycles with less than a 30% drop in capacitance. In one embodiment, a device 6 is capable of being charged at 100 amps to 2.5 volts and then discharged to 1.25 volts over 1,500,000 cycles with less than a 30% drop in capacitance. In one embodiment, when charged at 100 amps to 2.5 volts and then discharged to 1.25 volts over 70,000 cycles a device 6 experiences an increase in resistance of less than 100 percent. In one embodiment, a method of using a device 6 comprises the steps of: (a) charging the device from 1.25 volts to 2.5 volts at 100 amps; (b) discharging the device to 1.25 volts; and (c) measuring less than a 30% drop in an initial capacitance of the device after repeating step (a) and step (b) 70,000 times. In one embodiment, a method of using a device 6 comprises the steps of: (a) charging the device from 1.25 volts to 2.5 volts at 100 amps; (b) discharging the device to 1.25 volts; and (c) measuring less than a 5% drop in an initial capacitance of the device after repeating step (a) and step (b) 70,000 times.

In the embodiments that follow, it will be understood that reference to no-use and non-use of additive(s) in the manufacture of an energy storage device according to the present invention takes into account that electrolyte may be used during a final electrode electrolyte immersion/impregnation step. An electrode electrolyte immersion/impregnation step is typically utilized prior to providing a final finished capacitor electrode in a sealed housing. Furthermore, even though additives, such as solvents, liquids, and the like, are not used in the manufacture of embodiments disclosed herein, during manufacture, a certain amount of impurity, for example, moisture, may be absorbed or attach itself from a surrounding environment. Those skilled in the art will understand that the dry particles used with embodiments and processes disclosed herein may also, prior to their being provided by particle manufacturers as dry particles, have themselves been pre-processed with additives and, thus, comprise one or more pre-process residue. For these reasons, despite the non-use of additives, one or more of the embodiments and processes disclosed herein may require a drying step (which, however, if performed with embodiments of the present invention, can be much shorter than the drying steps of the prior art) prior to a final electrolyte impregnation step so as to remove/reduce such aforementioned pre-process residues and impurities. It is identified that even after one or more drying step, trace amounts of the aforementioned pre-process residues and impurities may be present in the prior art, as well as embodiments described herein.

In general, because both the prior art and embodiments of the present invention obtain base particles and materials from similar manufacturers, and because they may be exposed to similar pre-process environments, measurable amounts of prior art pre-process residues and impurities may be similar in magnitude to those of embodiments of the present invention, although variations may occur due to differences in pre-processes, environmental effects, etc. In the prior art, the magnitude of such pre-process residues and impurities is smaller than that of the residues and impurities that remain and that can be measured after processing additives are used. This measurable amount of processing additive based residues and impurities can be used as an indicator that processing additives have been used in a prior art energy storage device product. The lack of such measurable amounts of processing additive can as well be used to distinguish the non-use of processing additives in embodiments of the present invention.

Table 1 indicates the results of a chemical analysis of a prior art electrode film and an embodiment of a dry electrode film made in accordance with principles disclosed further herein. The chemical analysis was conducted by Chemir Analytical Services, 2672 Metro Blvd., Maryland Heights, Mo. 63043, Phone 314-291-6620. Two samples were analyzed with a first sample (Chemir 533572) comprised of finely ground powder obtained from a prior art additive based electrode film sold under the EXCELLERATOR™ brand of electrode film by W.L Gore & Associates, Inc. 401 Airport Rd., Elkton, Md. 21922, 410-392-444. A second sample (Chemir 533571) comprised a thin black sheet of material cut into ⅛ to 1 inch sided irregularly shaped pieces obtained from a dry film 33 (as discussed in FIG. 2g below). The second sample (Chemir 533571) comprised a particle mixture of about 80% to 90% activated carbon, about 0% to 15% conductive carbon, and about 3% to 15% PTFE binder by weight. Suitable carbon powders are available from a variety of sources, including YP-17 activated carbon particles sold by Kuraray Chemical Co., LTD, Shin-hankyu Bldg. 9F Blvd. C-237, 1-12-39 Umeda, Kiata-ku, Osaka 530-8611, Japan; and BP 2000 conductive particles sold by Cabot Corp. 157 Concord Road, P.O. Box 7001, Billerica, Mass. 01821-7001, Phone: 978 663-3455. A tared portion of prior art sample Chemir 53372 was transferred to a quartz pyrolysis tube. The tube with its contents was placed inside of a pyrolysis probe. The probe was then inserted into a valved inlet of a gas chromatograph. The effluent of the column was plumbed directly into a mass spectrometer that served as a detector. This configuration allowed the sample in the probe to be heated to a predetermined temperature causing volatile analytes to be swept by a stream of helium gas into the gas into the gas chromatograph and through the analytical column, and to be detected by the mass spectrometer. The pyrolysis probe was flash heated from ambient temperature at a rate of 5 degrees C./millisecond to 250 degrees C. and held constant for 30 seconds. The gas chromatograph was equipped with a 30 meter Agilent. DB-5 analytical column. The gas chromatograph oven temperature was as follows: the initial temperature was held at 45 degrees C. for 5 minutes and then was ramped at 20 degrees C. to 300 degrees C. and held constant for 12.5 minutes. A similar procedure was conducted for sample 53371 of a dry film 33. Long chain branched hydrocarbon olefins were detected in both samples, with 2086 parts per million (PPM) detected in the prior art sample, and with 493 PPM detected in dry film 33. Analytes dimethylamine and a substituted alkyl propanoate were detected in sample Chemir 53372 with 337 PPM and were not detected in sample Chemir 53371. It is envisioned that future analysis of other prior art additive based electrode films will provide similar results with which prior art use of processing additives, or equivalently, the non-use of additives of embodiments described herein, can be identified and distinguished.

One or more prior art additives, impurities, and residues that exist in, or are utilized by, and that may be present in lower quantities in embodiments of the present invention than the prior art, include: hydrocarbons, high boiling point solvents, antifoaming agents, surfactants, dispersion aids, water, pyrrolidone mineral spirits, ketones, naphtha, acetates, alcohols, glycols, toluene, xylene, Isopars™, plasticizers, and the like.

TABLE 1

Pyrolysis GC/MS Analysis

| Retention Time in Minutes | Chemir 53371 | Chemir 53372 (Prior Art) |
|---|---|---|
| 1.65 | 0 PPM | 0 PPM |
| 12.3 | 0 PPM | 0 PPM |
| 13.6 | 0 PPM | Butylated hydroxyl toluene 337 PPM |
| 20.3 | 0 PPM | 0 PPM |
| 20.6 | A long chain branched hydrocarbon 493 PPM | A long chain branched hydrocarbon olefin 2086 PPM |

Referring now to FIG. 1a, a block diagram illustrating a process for making a dry particle based energy storage device is shown. As used herein, the term "dry" implies non-use of additives during process steps described herein, other than during a final impregnating electrolyte step. The process shown in FIG. 1a begins by blending dry carbon particles and dry binder together. As previously discussed, one or more of such dry carbon particles, as supplied by carbon particle manufacturers for use herein, may have been pre-processed. Those skilled in the art will understand that depending on particle size, particles can be described as powders and the like, and that reference to particles is not meant to be limiting to the embodiments described herein, which should be limited only by the appended claims and their equivalents. For example, within the scope of the term "particles," the present invention contemplates powders, spheres, platelets, flakes, fibers, nano-tubes, and other particles with other dimensions and other aspect ratios. In one embodiment, dry carbon particles as referenced herein refers to activated carbon particles 12 and/or conductive particles 14, and binder particles 16 as referenced herein refers to an inert dry binder. In one embodiment, conductive particles 14 comprise conductive carbon particles. In one embodiment, conductive particles 14 comprise conductive graphite particles. In one embodiment, it is envisioned that conductive particles 14 comprise a metal powder or the like. In one embodiment, dry binder 16 comprises a fibrillizable fluoropolymer, for example, polytetrafluoroethylene (PTFE) particles. Other possible fibrillizable binders include ultrahigh molecular weight polypropylene, polyethylene, copolymers, polymer blends and the like. It is understood that the present invention should not be limited by the disclosed or suggested particles and binder, but rather, by the claims that follow. In one embodiment, particular mixtures of particles 12, 14, and binder 16 comprise about 50% to 99% activated carbon, about 0% to 25% conductive carbon, and/or about 0.5% to 50% binder by weight. In a more particular embodiment, particle mixtures include about 80% to 90% activated carbon, about 0% to 15% conductive carbon, and about 3% to 15% binder by weight. In one embodiment, the activated carbon particles 12 comprise a mean diameter of about 10 microns. In one embodiment, the conductive carbon particles 14 comprise diameters less than 20 microns. In one embodiment, the binder particles 16 comprise a mean diameter of about 450 microns. Suitable carbon powders are available from a variety of sources, including YP-17 activated carbon particles sold by Kuraray Chemical Co., LTD, Shin-hankyu Bldg. 9F Blvd. C-237, 1-12-39 Umeda, Kiata-ku, Osaka 530-8611, Japan; and BP 2000 conductive particles sold by Cabot Corp. 157 Concord Road, P.O. Box 7001, Billerica, Mass. 01821-7001, Phone: 978 663-3455.

In step 18, particles of activated carbon, conductive carbon, and binder provided during respective steps 12, 14, and 16 are dry blended together to form a dry mixture. In one embodiment, dry particles 12, 14, and 16 are blended for 1 to 10 minutes in a V-blender equipped with a high intensity mixing bar until a uniform dry mixture is formed. Those skilled in the art will identify that blending time can vary based on batch size, materials, particle size, densities, as well as other properties, and yet remain within the scope of the present invention. With reference to blending step 18, in one embodiment, particle size reduction and classification can be carried out as part of the blending step 18, or prior to the blending step 18. Size reduction and classification may improve consistency and repeatability of the resulting blended mixture and, consequently, of the quality of the electrode films and electrodes fabricated from the dry blended mixture.

After dry blending step 18, dry binder 16 within the dry particles is fibrillized in a dry fibrillizing step 20. The dry fibrillizing step 20 is effectuated using a dry solventless and liquidless high shear technique. During dry fibrillizing step 20, high shear forces are applied to dry binder 16 in order to physically stretch it. The stretched binder forms a network of thin web-like fibers that act to enmesh, entrap, bind, and/or support the dry particles 12 and 14. In one embodiment, fibrillizing step 20 may be effectuated using a jet-mill.

Figure 1B:
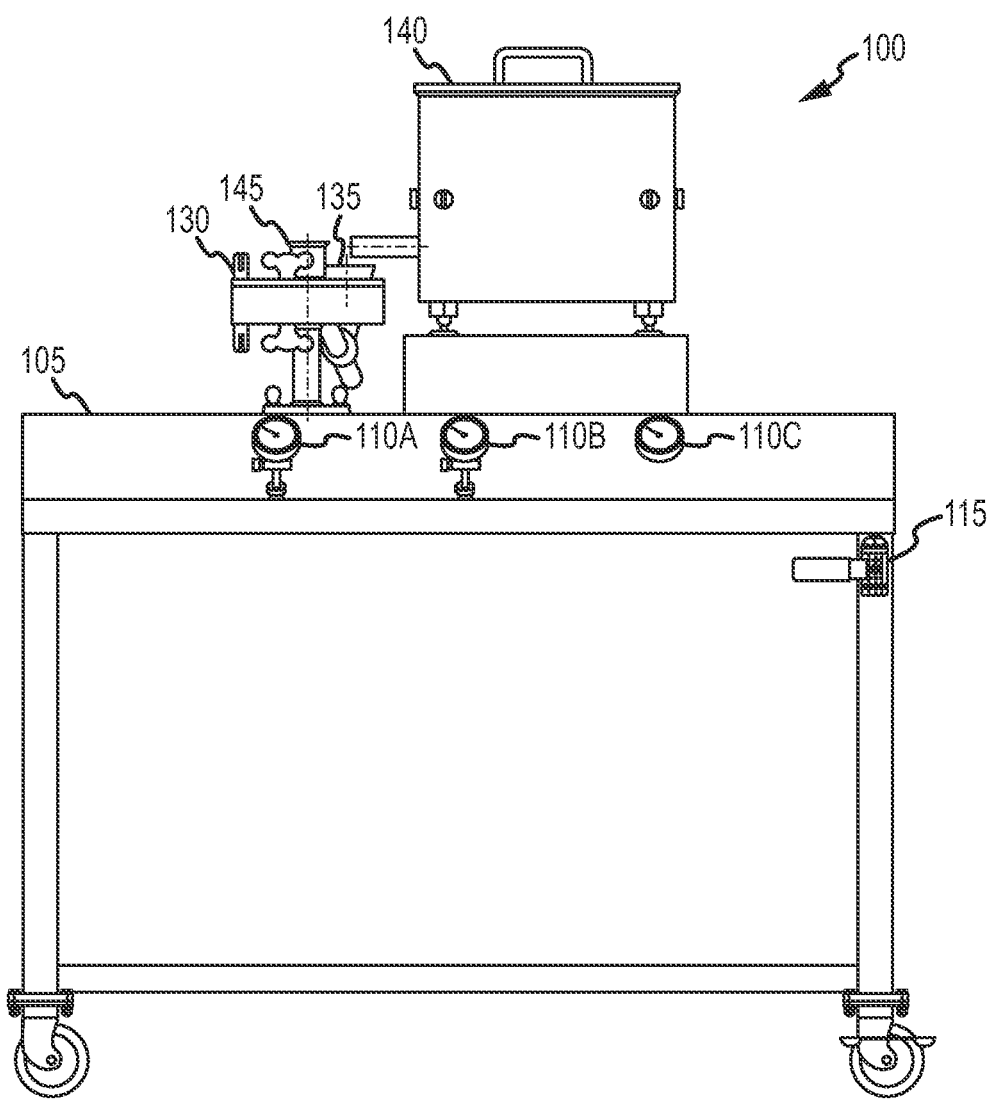
FIG. 1*b* is a high-level front view of a jet-mill assembly used to fibrillize binder within a dry carbon particle mixture.
Figure 1C:
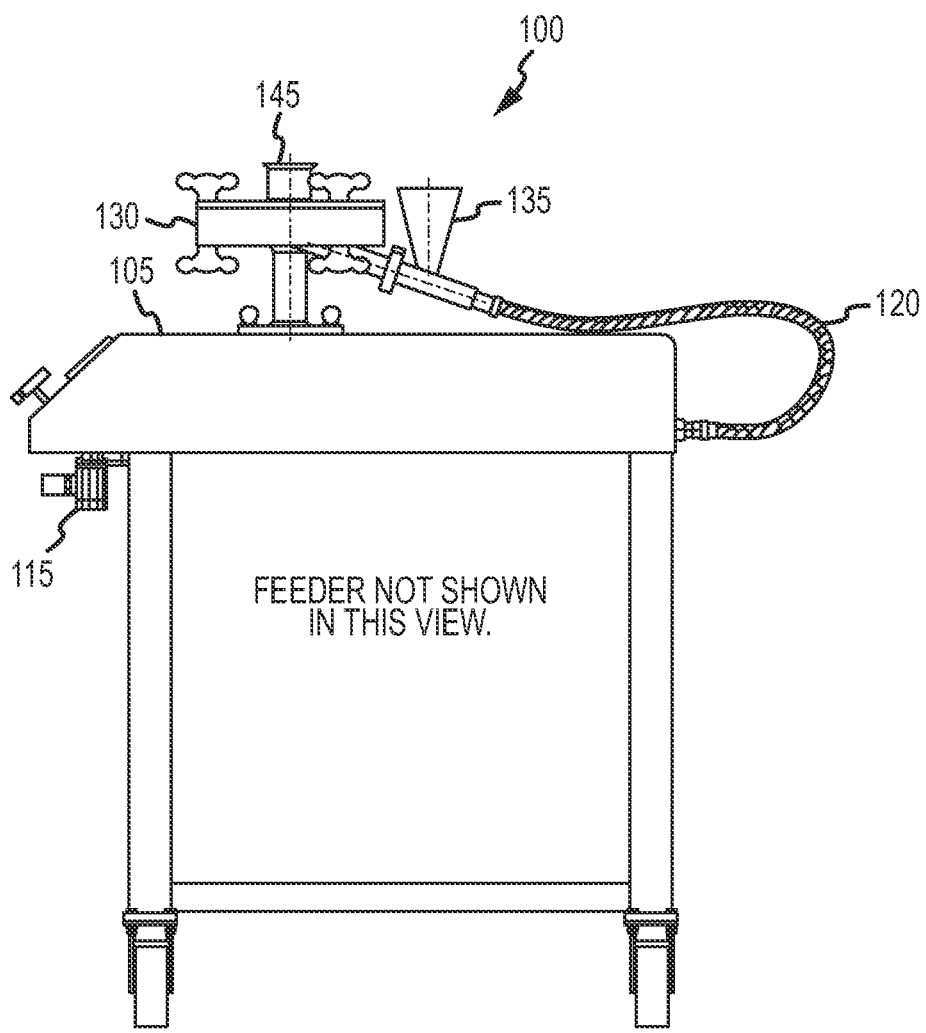
FIG. 1*c* is a high-level side view of a jet-mill assembly shown in FIG. 1*b*.
Figure 1D:
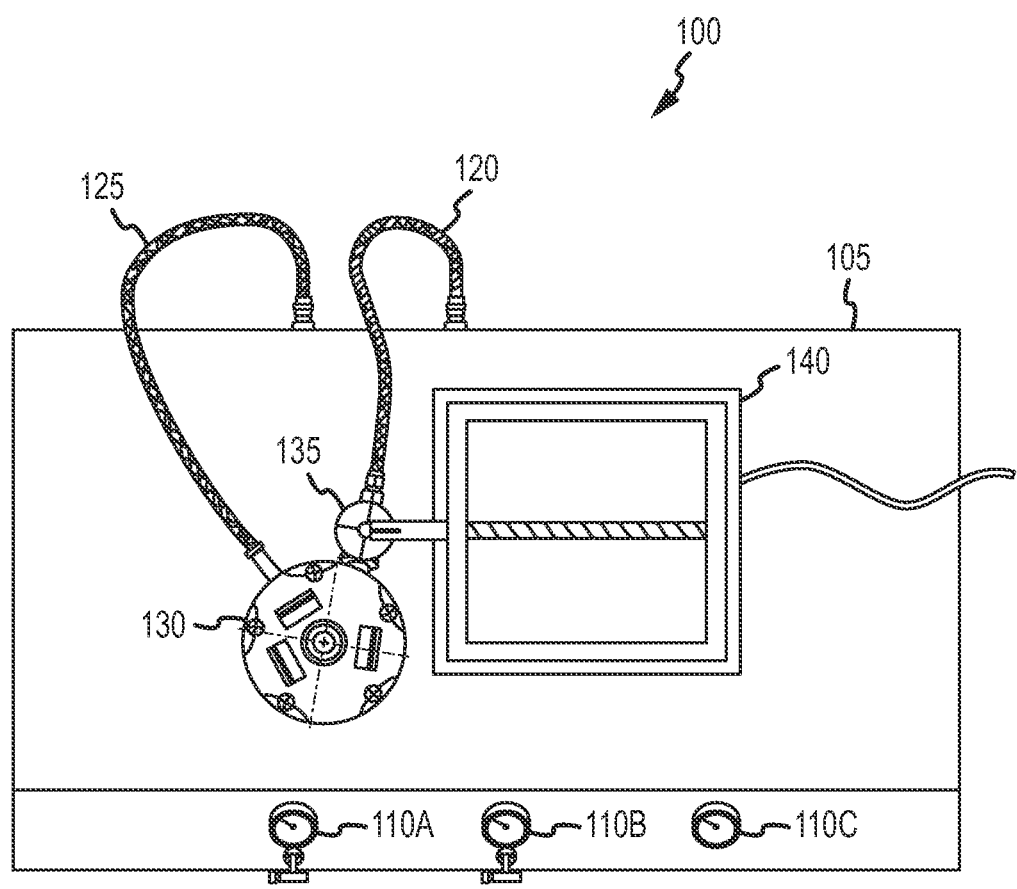
FIG. 1*d* is a high-level top view of the jet-mill assembly shown in FIGS. 1*b* and 1*c*.

Referring to now to FIGS. 1b, 1c, and 1d, there is seen, respectively, front, side, and top views of a jet-mill assembly 100 used to perform a dry fibrillization step 20. For convenience, the jet-mill assembly 100 is installed on a movable auxiliary equipment table 105, and includes indicators 110 for displaying various temperatures and gas pressures that arise during operation. A gas input connector 115 receives compressed air from an external supply and routes the compressed air through internal tubing (not shown) to a feed air hose 120 and a grind air hose 125, which both lead and are connected to a jet-mill 130. The jet-mill 130 includes: (1) a funnel-like material receptacle device 135 that receives compressed feed air from the feed air hose 120, and the blended carbon-binder mixture of step 18 from a feeder 140; (2) an internal grinding chamber where the carbon-binder mixture material is processed; and (3) an output connection 145 for removing the processed material. In the illustrated embodiment, the jet-mill 130 is a 4-inch Micronizer® model available from Sturtevant, Inc., 348 Circuit Street, Hanover, Mass. 02339; telephone number (781) 829-6501. The feeder 140 is an AccuRate® feeder with a digital dial indicator model 302M, available from Schenck AccuRate®, 746 E. Milwaukee Street, P.O. Box 208, Whitewater, Wis. 53190; telephone number (888) 742-1249. The feeder includes the following components: a 0.33 cubic ft. internal hopper; an external paddle agitation flow aid; a 1.0-inch, full pitch, open flight feed screw; a ¾ hp, 90VDC, 1,800 rpm, TENV electric motor drive; an internal mount controller with a variable speed, 50:1 turndown ratio; and a 110 Volt, single-phase, 60 Hz power supply with a power cord. The feeder 140 dispenses the carbon-binder mixture provided by step 18 at a preset rate. The rate is set using the digital dial, which is capable of settings between 0 and 999, linearly controlling the feeder operation. The highest setting of the feeder dial corresponds to a feeder output of about 12 kg per hour.

Figure 1E:
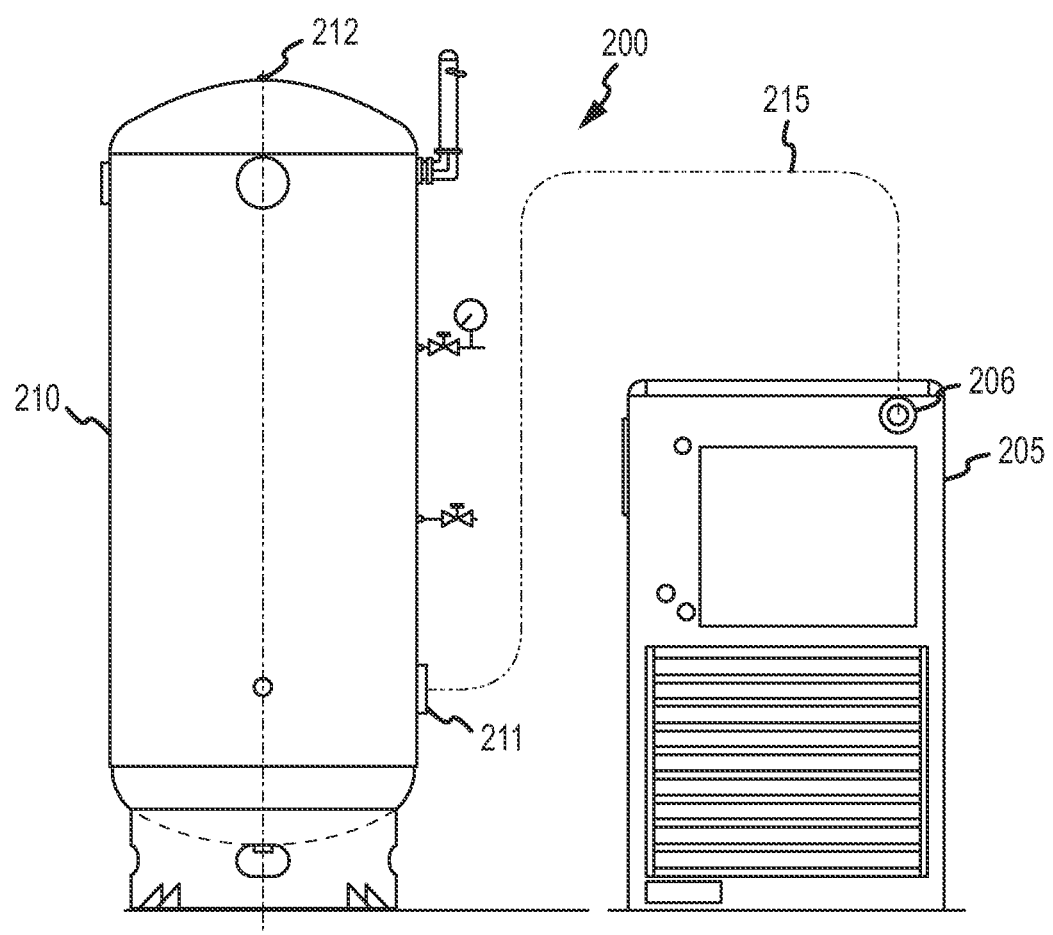
FIG. 1e is a high-level front view of a compressor and a compressed air storage tank used to supply compressed air to a jet-mill assembly.
Figure 1F:
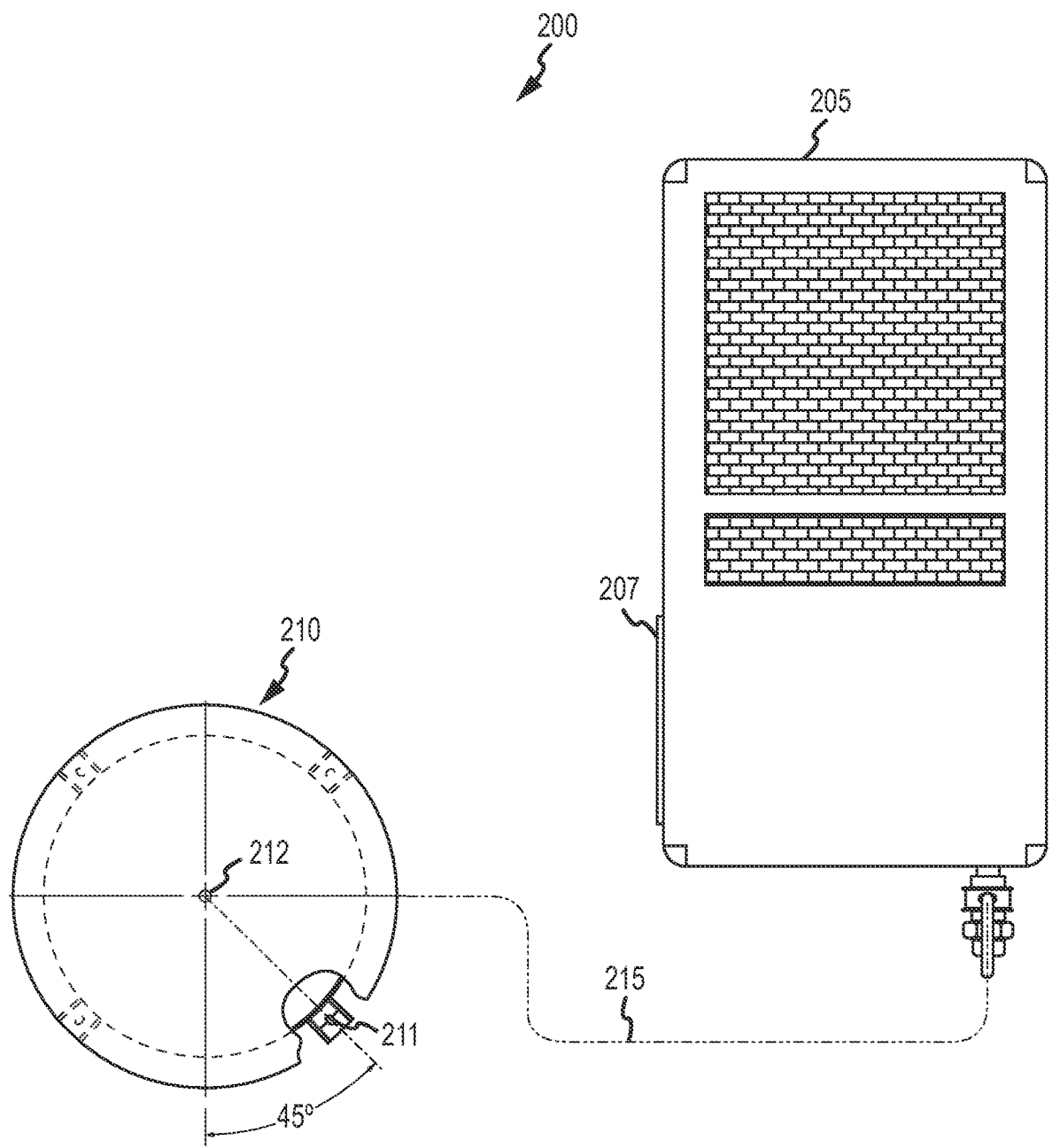
FIG. 1f is a high-level top view of the compressor and the compressed air storage tank shown in FIG. 1e, in accordance with the present invention.

The feeder 140 appears in FIGS. 1b and 1d, but has been omitted from FIG. 1c, to prevent obstruction of view of other components of the jet-mill 130. The compressed air used in the jet-mill assembly 100 is provided by a combination 200 of a compressor 205 and a compressed air storage tank 210, illustrated in FIGS. 1e and 1f; FIG. 1e is a front view and FIG. 1f is a top view of the combination 200. The compressor 205 used in this embodiment is a GA 30-55C model available from Atlas Copco Compressors, Inc., 161 Lower Westfield Road, Holyoke, Mass. 01040; telephone number (413) 536-0600. The compressor 205 includes the following features and components: air supply capacity of 180 standard cubic feet per minute ("SCFM") at 125 PSIG; a 40-hp, 3-phase, 60 HZ, 460 VAC premium efficiency motor; a WYE-delta reduced voltage starter; rubber isolation pads; a refrigerated air dryer; air filters and a condensate separator; an air cooler with an outlet 206; and an air control and monitoring panel 207. The 180-SCFM capacity of the compressor 205 is more than sufficient to supply the 4-inch Micronizer® jet-mill 130, which is rated at 55 SCFM. The compressed air storage tank 210 is a 400-gallon receiver tank with a safety valve, an automatic drain valve, and a pressure gauge. The compressor 205 provides compressed air to the tank 205 through a compressed air outlet valve 206, a hose 215, and a tank inlet valve 211.

It is identified that the compressed air provided under high-pressure by compressor 205 is preferably as dry as possible. Thus, in one embodiment, an appropriately placed in-line filter and/or dryer may be added. In one embodiment, a range of acceptable dew point for the air is about −20 to −40 degrees F., and a water content of less than 20 ppm. Although discussed as being effectuated by high-pressure air, it is understood that other sufficiently dry gases are envisioned as being used to fibrillize binder particles utilized in embodiments of the present invention, for example, oxygen, nitrogen, helium, and the like.

In the jet-mill 130, the carbon-binder mixture is inspired by venturi and transferred by the compressed feed air into a grinding chamber, where the fibrillization of the mixture takes place. In one embodiment, the grinding chamber is lined with a ceramic such that abrasion of the internal walls of the jet-mill is minimized and so as to maintain purity of the resulting jet-milled carbon-binder mixture. The grinding chamber, which has a generally cylindrical shape, includes one or more nozzles placed circumferentially. The nozzles discharge the compressed grind air that is supplied by the grind air hose 125. The compressed air jets injected by the nozzles accelerate the carbon-binder particles and cause predominantly particle-to-particle collisions, although some particle-wall collisions also take place. The collisions dissipate the energy of the compressed air relatively quickly, fibrillizing the dry binder 16 within the mixture and embedding carbon particle 12 and 14 aggregates and agglomerates into the lattice formed by the fibrillized binder. The collisions may also cause size reduction of the carbon aggregates and agglomerates. The colliding particles 12, 14, and 16 spiral towards the center of the grinding chamber and exit the chamber through the output connection 145.

Figure 1G:
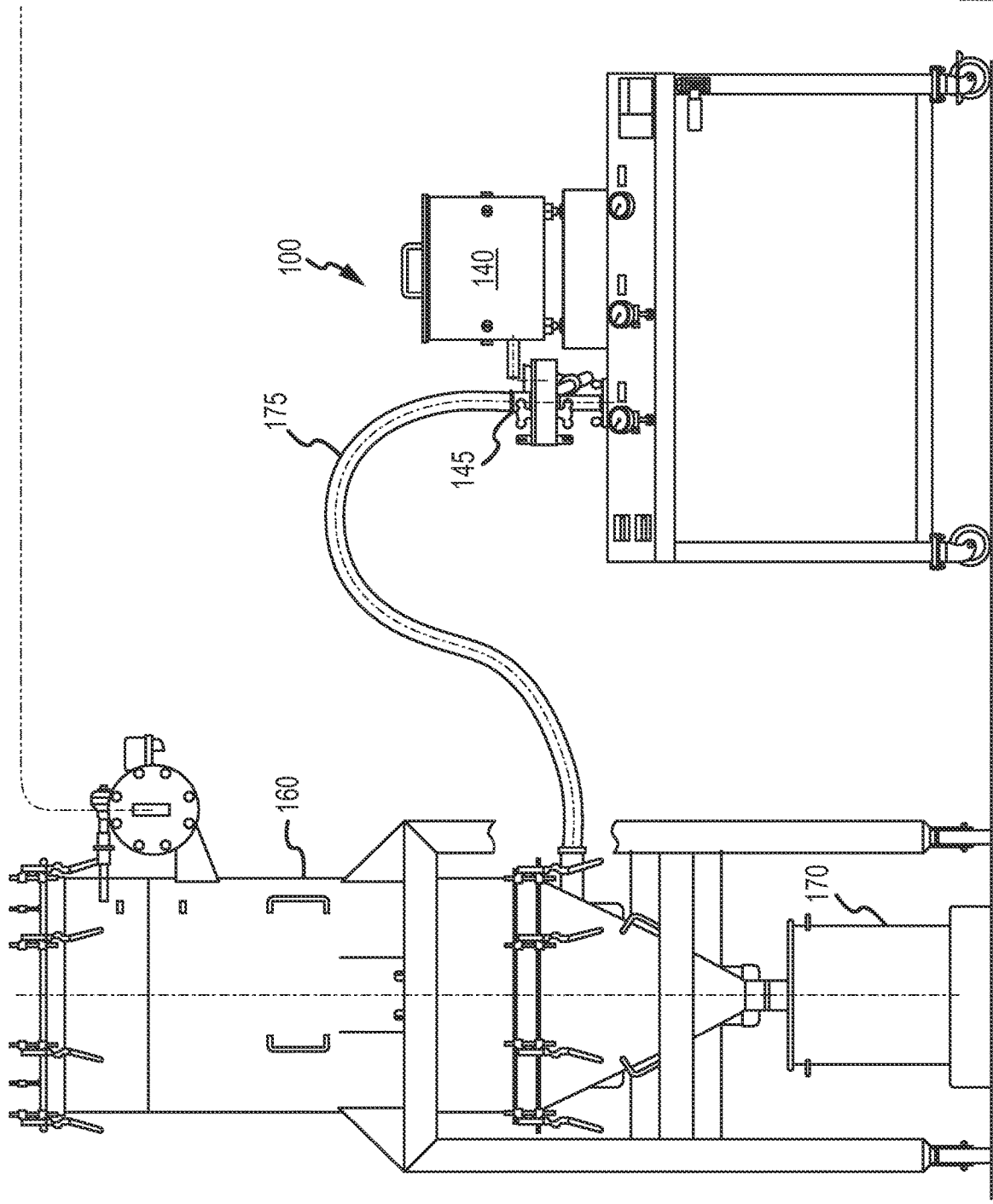
FIG. 1g is a high-level front view of the jet-mill assembly of FIGS. 1b-d in combination with a dust collector and a collection container.
Figure 1H:
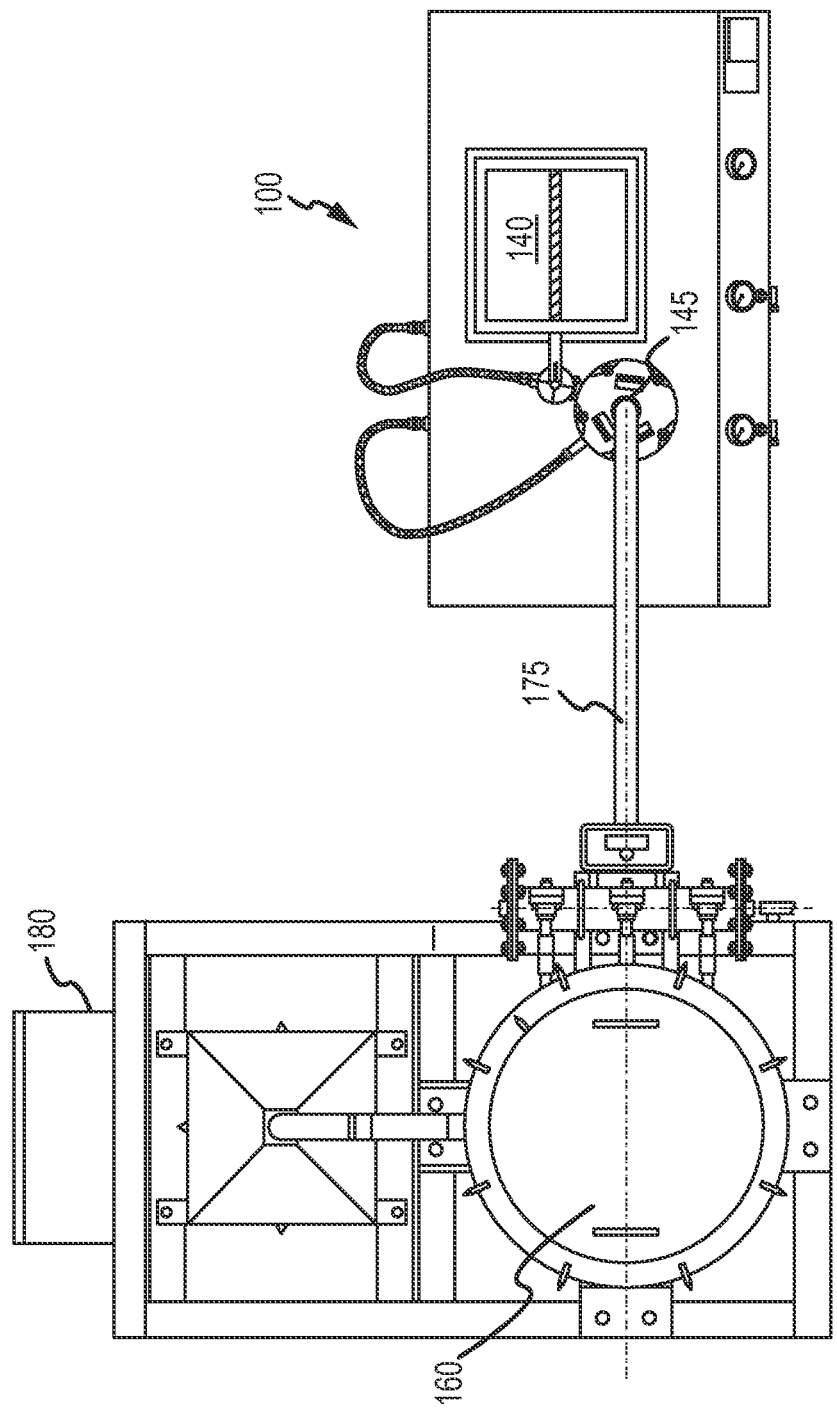
FIG. 1h is a high-level top view of the combination of FIGS. 1f and 1g.
Figure 2A:
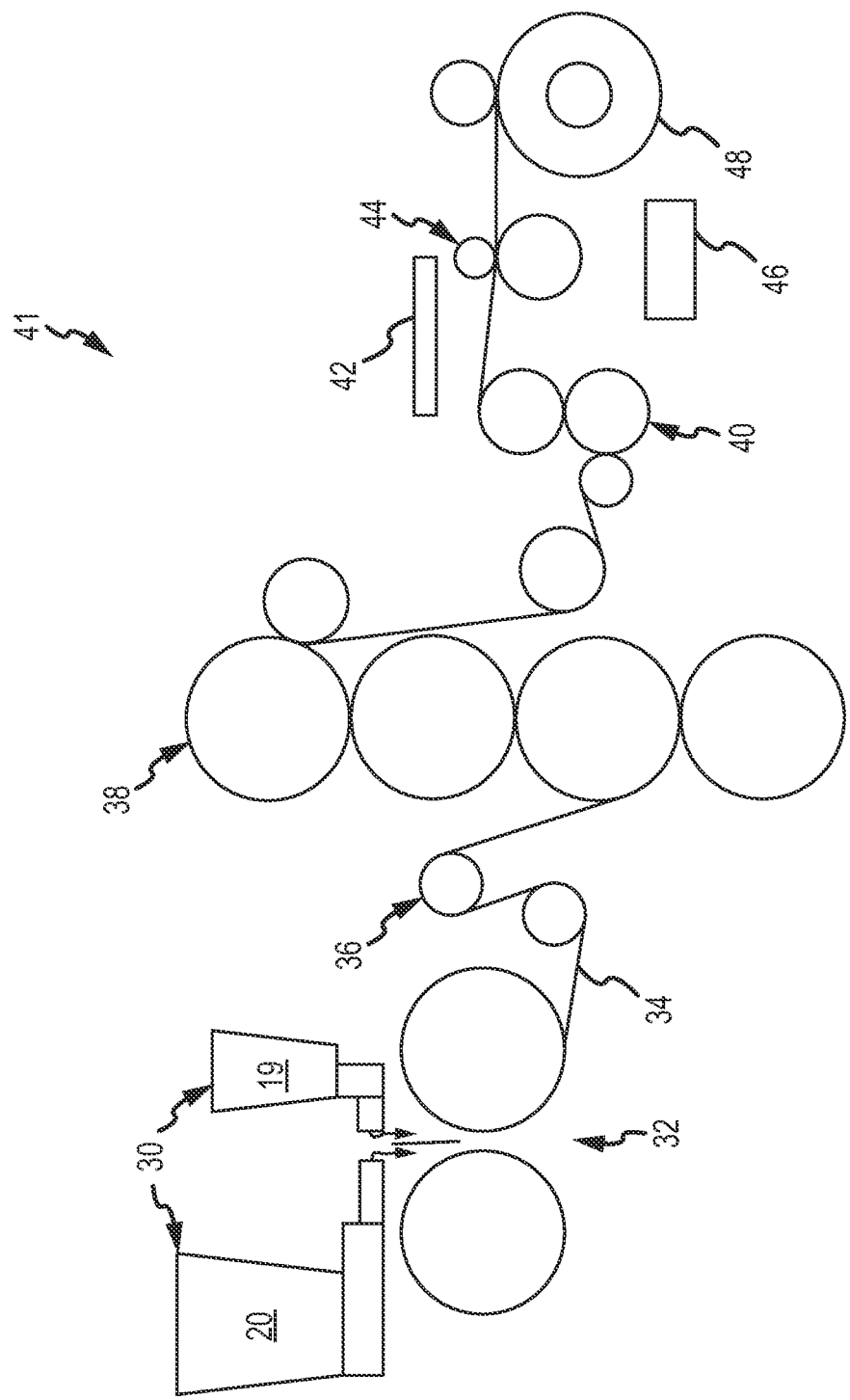
FIG. 2a shows an apparatus for forming a structure of an electrode.

Referring now to FIGS. 1g and 1h, there are seen front and top views, respectively, of the jet-mill assembly 100, a dust collector 160, and a collection container 170 (further referenced in FIG. 2a as container 20). In one embodiment, the fibrillized carbon-binder particles that exit through the output connection 145 are guided by a discharge hose 175 from the jet-mill 130 into a dust collector 160. In the illustrated embodiment, the dust collector 160 is model CL-7-36-11 available from Ultra Industries, Inc., 1908 DeKoven Avenue, Racine, Wis. 53403; telephone number (262) 633-5070. Within the dust collector 160 the output of the jet-mill 130 is separated into (1) air, and (2) a dry fibrillized carbon-binder particle mixture 20. The carbon-binder mixture is collected in the container 170, while the air is filtered by one or more filters and then discharged. The filters, which may be internal or external to the dust collector 160, are periodically cleaned, and the dust is discarded. Operation of the dust collector is directed from a control panel 180.

It has been identified that a dry compounded material, which is provided by dry fibrillization step 20, retains its homogeneous particle like properties for a limited period of time. In one embodiment, because of forces, for example, gravitational forces exerted on the dry particles 12, 14, and 16, the compounded material begins to settle such that spaces and voids that exist between the dry particles 12, 14, 16 after step 20 gradually become reduced in volume. In one embodiment, after a relatively short period of time, for example 10 minutes or so, the dry particles 12, 14, 16 compact together and begin to form clumps or chunks such that the homogeneous properties of the compounded material may be diminished and/or such that downstream processes that require free flowing compounded materials are made more difficult or impossible to achieve. Accordingly, in one embodiment, it is identified that a dry compounded material as provided by step 20 should be utilized before its homogeneous properties are no longer sufficiently present and/or that steps are taken to keep the compounded material sufficiently aerated to avoid clumping.

It should be noted that the specific processing components described so far may vary as long as the intent of the embodiments described herein is achieved. For example, techniques and machinery that are envisioned for potential use to provide high shear forces to effectuate a dry fibrillization step 20 include jet-milling, pin milling, impact pulverization, and hammer milling, and other techniques and apparatus. Further in example, a wide selection of dust collectors can be used in alternative embodiments, ranging from simple free-hanging socks to complicated housing designs with cartridge filters or pulse-cleaned bags. Similarly, other feeders can be easily substituted in the assembly 100, including conventional volumetric feeders, loss-weight volumetric feeders, and vibratory feeders. The size, make, and other parameters of the jet-mill 130 and the compressed air supply apparatus (the compressor 205 and the compressed air storage tank 210) may also vary and yet be within the scope of the present invention.

The present inventors have performed a number of experiments to investigate the effects of three factors in the operation of jet-mill assembly 100 on qualities of the dry compounded material provided by dry fibrillization step 20, and on compacted/calendered electrode films fabricated therefrom. The three factors are these: (1) feed air pressure, (2) grind air pressure, and (3) feed rate. The observed qualities included tensile strength in width (i.e., in the direction transverse to the direction of movement of a dry electrode film in a high-pressure calender during a compacting process); tensile strength in length (i.e., in the direction of the dry film movement); resistivity of the jet-mill processed mixture provided by dry fibrillization step 20; internal resistance of electrodes made from the dry electrode film in a double layer capacitor application; and specific capacitance achieved in a double layer capacitor application. Resistance and specific capacitance values were obtained for both charge (up) and discharge (down) capacitor cycles.

The design of experiments ("DOE") included a three-factorial, eight experiment investigation performed with dry electrode films dried for 3 hours under vacuum conditions at 160 degrees Celsius. Five or six samples were produced in each of the experiments, and values measured on the samples of each experiment were averaged to obtain a more reliable result. The three-factorial experiments included the following points for the three factors:

1. Feed rate was set to indications of 250 and 800 units on the feeder dial used. Recall that the feeder rate has a linear dependence on the dial settings, and that a full-scale setting of 999 corresponds to a rate of production of about 12 kg per hour (and therefore a substantially similar material consumption rate). Thus, settings of 250 units corresponded to a feed rate of about 3 kg per hour, while settings of 800 units corresponded to a feed rate of about 9.6 kg per hour. In accordance with the standard vernacular used in the theory of design of experiments, in the accompanying tables and graphs the former setting is designated as a "0" point, and the latter setting is designated as a "1" point.

2. The grind air pressure was set alternatively to 85 psi and 110 psi, corresponding, respectively, to "0" and "1" points in the accompanying tables and graphs.

3. The feed air pressure (also known as inject air pressure) was set to 60 and 70 psi, corresponding, respectively, to "0" and "1" points.

Turning first to tensile strength measurements, strips of standard width were prepared from each sample, and the tensile strength measurement of each sample was normalized to a one-mil thickness. The results for tensile strength measurements in length and in width appear in Tables 2 and 3 below.

TABLE 2

Tensile Strength in Length

| Exp. No. | FACTORS (Feed Rate, Grind psi, Feed psi) | DOE POINTS | SAMPLE THICKNESS (mil) | TENSILE STRENGTH IN LENGTH (grams) | NORMALIZED TENSILE STRENGTH IN LENGTH (g/mil) |
|---|---|---|---|---|---|
| 1 | 250/85/60 | 0/0/0 | 6.1 | 123.00 | 20.164 |
| 2 | 250/85/70 | 0/0/1 | 5.5 | 146.00 | 26.545 |
| 3 | 250/110/60 | 0/1/0 | 6.2 | 166.00 | 26.774 |
| 4 | 250/110/70 | 0/1/1 | 6.1 | 108.00 | 17.705 |
| 5 | 800/85/60 | 1/0/0 | 6.0 | 132.00 | 22.000 |
| 6 | 800/85/70 | 1/0/1 | 5.8 | 145.00 | 25.000 |
| 7 | 800/110/60 | 1/1/0 | 6.0 | 135.00 | 22.500 |
| 8 | 800/110/70 | 1/1/1 | 6.2 | 141.00 | 22.742 |

TABLE 3

Tensile Strength in Width

| Exp. No | Factors (Feed Rate, Grind psi, Feed psi) | DOE Points | Sample Thickness (mil) | Tensile Strength in Length (grams) | Normalized Tensile Strength in Length (g/mil) |
|---|---|---|---|---|---|
| 1 | 250/85/60 | 0/0/0 | 6.1 | 63.00 | 10.328 |
| 2 | 250/85/70 | 0/0/1 | 5.5 | 66.00 | 12.000 |
| 3 | 250/110/60 | 0/1/0 | 6.2 | 77.00 | 12.419 |
| 4 | 250/110/70 | 0/1/1 | 6.1 | 59.00 | 9.672 |
| 5 | 800/85/60 | 1/0/0 | 6.0 | 58.00 | 9.667 |
| 6 | 800/85/70 | 1/0/1 | 5.8 | 70.00 | 12.069 |
| 7 | 800/110/60 | 1/1/0 | 6.0 | 61.00 | 10.167 |
| 8 | 800/110/70 | 1/1/1 | 6.2 | 63.00 | 10.161 |

Table 4 below presents resistivity measurements of a jet-mill-dry blend of particles provided by dry fibrillization step 20. Note that the resistivity measurements were taken before the mixture was processed into a dry electrode film.

TABLE 4

Dry Resistance

| Exp. No. | Factors (Feed Rate, Grind psi, Feed psi) | DOE Points | DRY RESISTANCE (Ohms) |
|---|---|---|---|
| 1 | 250/85/60 | 0/0/0 | 0.267 |
| 2 | 250/85/70 | 0/0/1 | 0.229 |
| 3 | 250/110/60 | 0/1/0 | 0.221 |
| 4 | 250/110/70 | 0/1/1 | 0.212 |
| 5 | 800/85/60 | 1/0/0 | 0.233 |
| 6 | 800/85/70 | 1/0/1 | 0.208 |
| 7 | 800/110/60 | 1/1/0 | 0.241 |
| 8 | 800/110/70 | 1/1/1 | 0.256 |

Figure 1I:
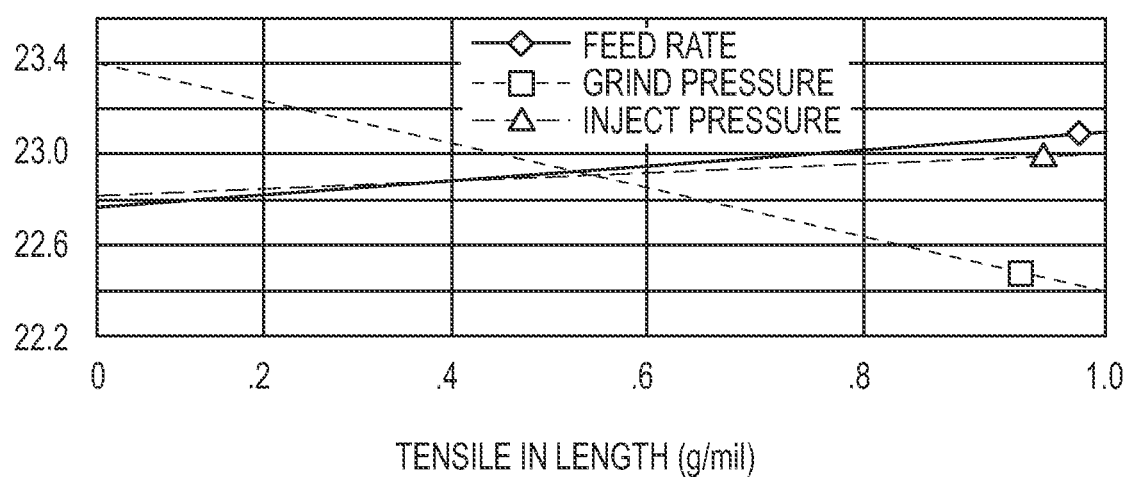
FIGS. 1i, 1j, and 1k illustrate effects of variations in feed rate, grind pressure, and feed pressure on tensile strength in length, tensile strength in width, and dry resistivity of electrode materials.
Figure 1J:
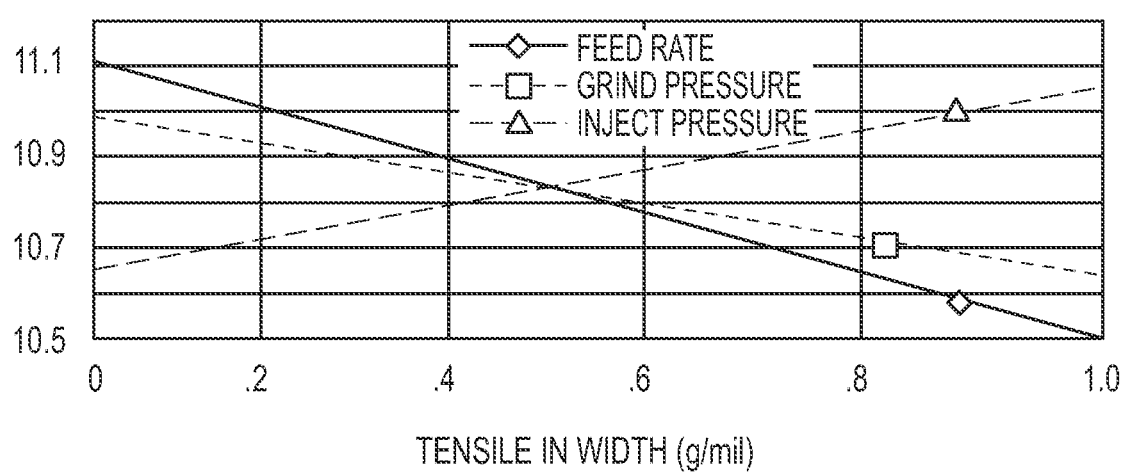
Figure 1K:
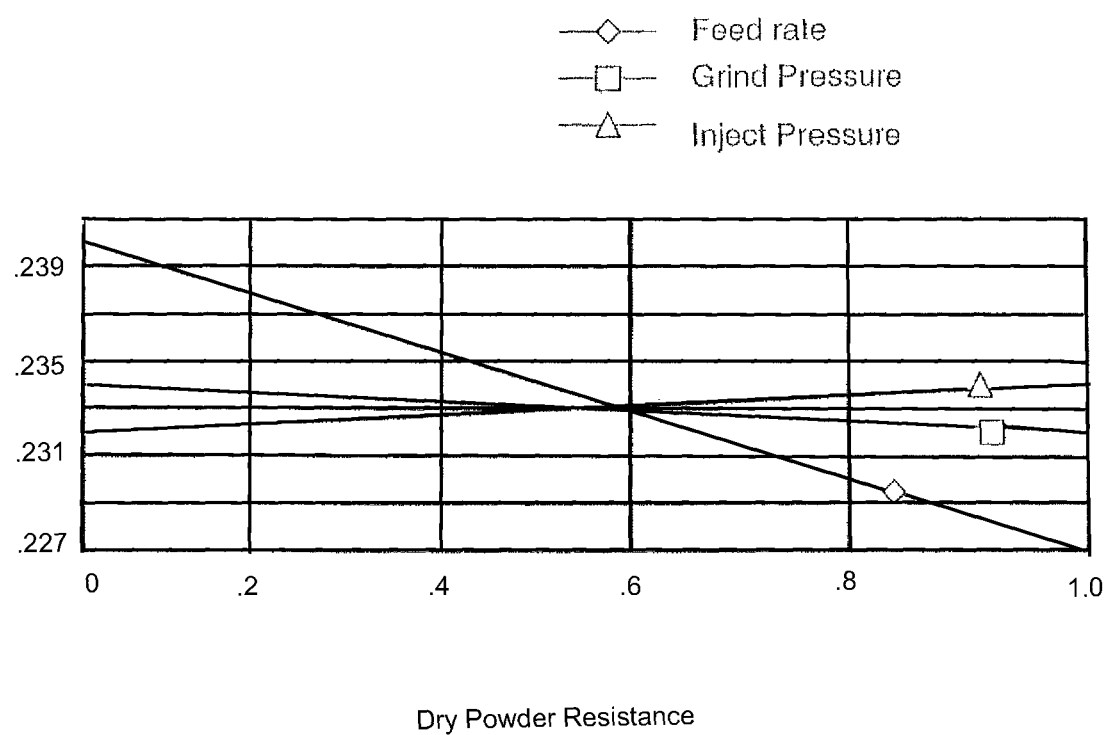

Referring now to FIGS. 1*i*, 1*j*, and 1*k*, there are illustrated the effects of the three factors on the tensile strength in length, tensile strength in width, and dry resistivity. Note that each end-point for a particular factor line (i.e., the feed rate line, grind pressure line, or inject pressure line) on a graph corresponds to a measured value of the quality parameter (i.e., tensile strength or resistivity) averaged over all experiments with the particular key factor held at either "0" or "1," as the case may be. Thus, the "0" end-point of the feed rate line (the left most point) represents the tensile strength averaged over experiments numbered 1-4, while the "1" end-point on the same line represents the tensile strength averaged over experiments numbered 4-8. As can be seen from FIGS. 1*i* and 1*j*, increasing the inject pressure has a moderate to large positive effect on the tensile strength of an electrode film. At the same time, increasing the inject pressure has the largest effect on the dry resistance of the powder mixture, swamping the effects of the feed rate and grind pressure. The dry resistance decreases with increasing the inject pressure. Thus, all three qualities benefit from increasing the inject pressure.

In Table 5 below we present data for final capacitances measured in double-layer capacitors utilizing dry electrode films made from dry fibrillized particles as described herein by each of the 8 experiments, averaged over the sample size of each experiment. Note that $C_{up}$ refers to the capacitances measured when charging double-layer capacitors, while $C_{up}$ values were measured when discharging the capacitors. As in the case of tensile strength data, the capacitances were normalized to the thickness of the electrode film. In this case, however, the thicknesses have changed, because the dry film has undergone compression in a high-pressure nip during the process of bonding the film to a current collector. It is noted in obtaining the particular results of Table 5, the dry electrode film was bonded to a current collector by an intermediate layer of adhesive. Normalization was carried out to the standard thickness of 0.150 millimeters.

TABLE 5

$C_{up}$ and $C_{down}$

| Exp. No. | Factors (Feed Rate, Grind psi, Feed psi) | DOE Points | Sample Thickness (mm) | $C_{up}$ (Farads) | Normalized $C_{up}$ (Farads) | $C_{down}$ (Farads) | NORMALIZED $C_{down}$ (Farads) |
|---|---|---|---|---|---|---|---|
| 1 | 250/85/60 | 0/0/0 | 0.149 | 1.09 | 1.097 | 1.08 | 1.087 |
| 2 | 250/85/70 | 0/0/1 | 0.133 | 0.98 | 1.105 | 0.97 | 1.094 |
| 3 | 250/110/60 | 0/1/0 | 0.153 | 1.12 | 1.098 | 1.11 | 1.088 |
| 4 | 250/110/70 | 0/1/1 | 0.147 | 1.08 | 1.102 | 1.07 | 1.092 |
| 5 | 800/85/60 | 1/0/0 | 0.148 | 1.07 | 1.084 | 1.06 | 1.074 |
| 6 | 800/85/70 | 1/0/1 | 0.135 | 1.00 | 1.111 | 0.99 | 1.100 |
| 7 | 800/110/60 | 1/1/0 | 0.150 | 1.08 | 1.080 | 1.07 | 1.070 |
| 8 | 800/110/70 | 1/1/1 | 0.153 | 1.14 | 1.118 | 1.14 | 1.118 |

In Table 6 we present data for resistances measured in each of the 8 experiments, averaged over the sample size of each experiment. Similarly to the previous table, $R_{up}$ designates resistance values measured when charging double-layer capacitors, while $R_{down}$ refers to resistance values measured when discharging the capacitors.

TABLE 6

$R_{up}$ and $R_{down}$

| Exp. No. | Factors (Feed Rate, Grind psi, Feed psi) | DOE Points | Sample Thickness (mm) | Electrode Resistance $R_{up}$ (Ohms) | Electrode Resistance $R_{down}$ (Ohms) |
|---|---|---|---|---|---|
| 1 | 250/85/60 | 0/0/0 | 0.149 | 1.73 | 1.16 |
| 2 | 250/85/70 | 0/0/1 | 0.133 | 1.67 | 1.04 |
| 3 | 250/110/60 | 0/1/0 | 0.153 | 1.63 | 1.07 |
| 4 | 250/110/70 | 0/1/1 | 0.147 | 1.64 | 1.07 |
| 5 | 800/85/60 | 1/0/0 | 0.148 | 1.68 | 1.11 |
| 6 | 800/85/70 | 1/0/1 | 0.135 | 1.60 | 1.03 |
| 7 | 800/110/60 | 1/1/0 | 0.150 | 1.80 | 1.25 |
| 8 | 800/110/70 | 1/1/1 | 0.153 | 1.54 | 1.05 |

Figure 1M:
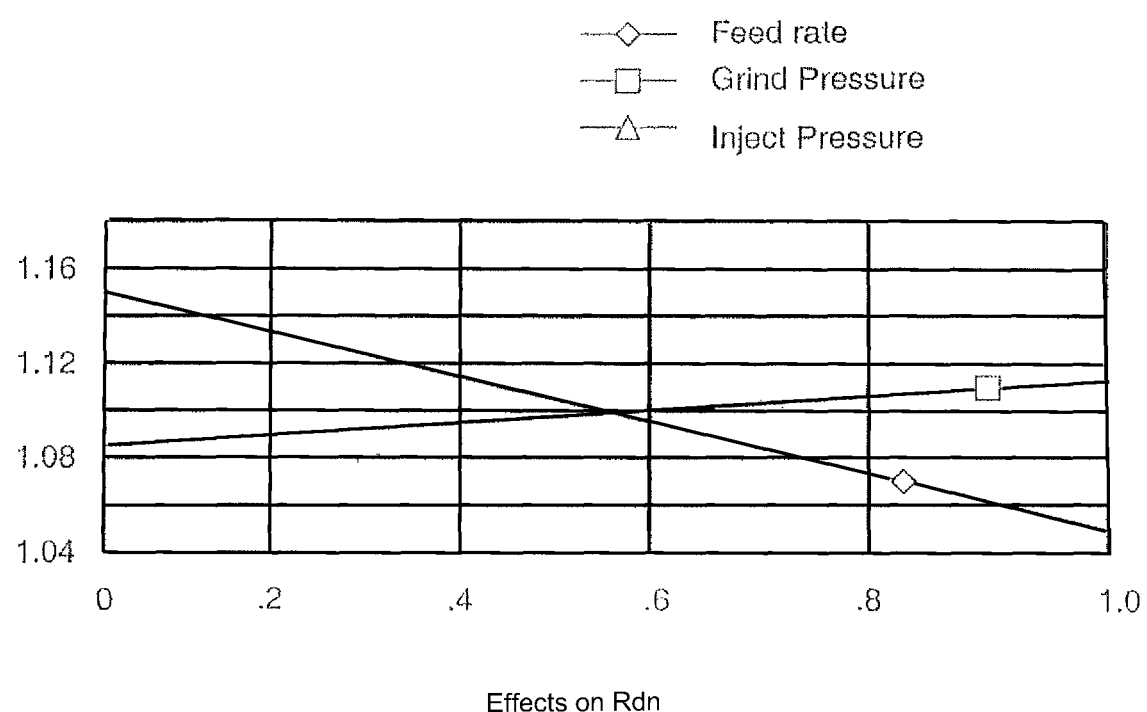
FIG. 1m illustrates effects of variations in feed rate, grind pressure, and feed pressure on internal resistance.
Figure 1N:
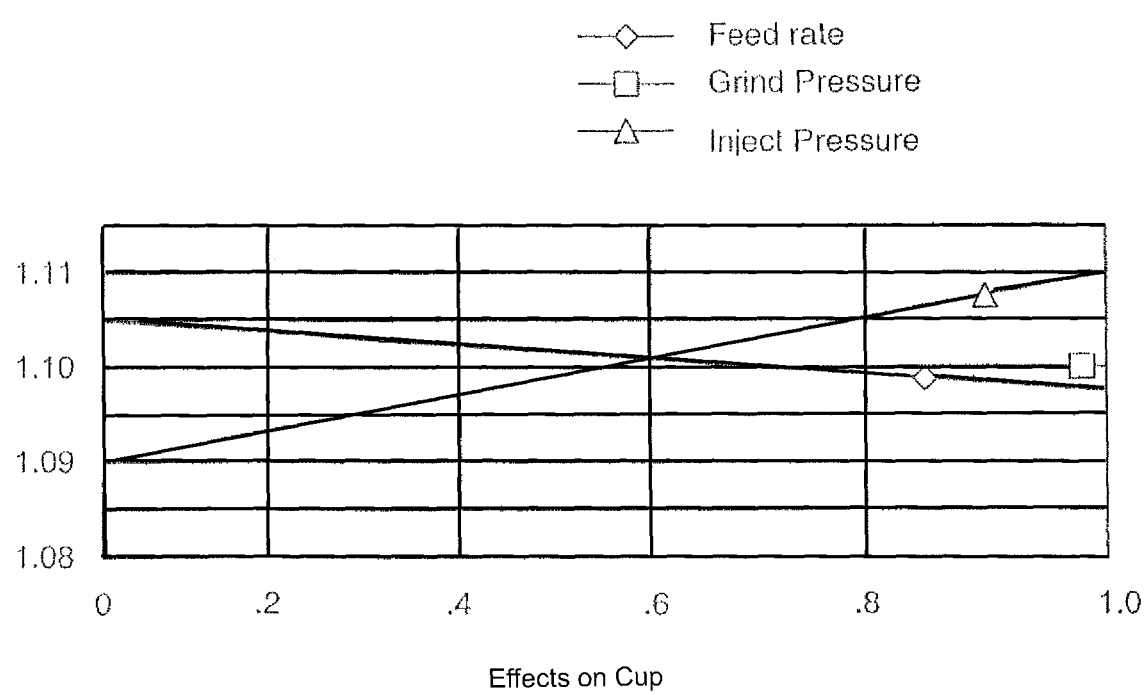
FIG. 1n illustrates effects of variations in feed rate, grind pressure, and feed pressure on capacitance.

To help visualize the above data and identify the data trends, we present FIGS. 1m and 1n, which graphically illustrate the relative importance of the three factors on the resulting $R_{down}$ and normalized $C_{up}$. Note that in FIG. 1m the Feed Rate and the Grind Pressure lines are substantially coincident.

Once again, increasing the inject pressure benefits both electrode resistance $R_{down}$ (lowering it), and the normalized capacitance $C_{up}$ (increasing it). Moreover, the effect of the inject pressure is greater than the effects of the other two factors. In fact, the effect of the inject pressure on the normalized capacitance overwhelms the effects of the feed rate and the grind pressure factors, at least for the factor ranges investigated.

Figure 1P:
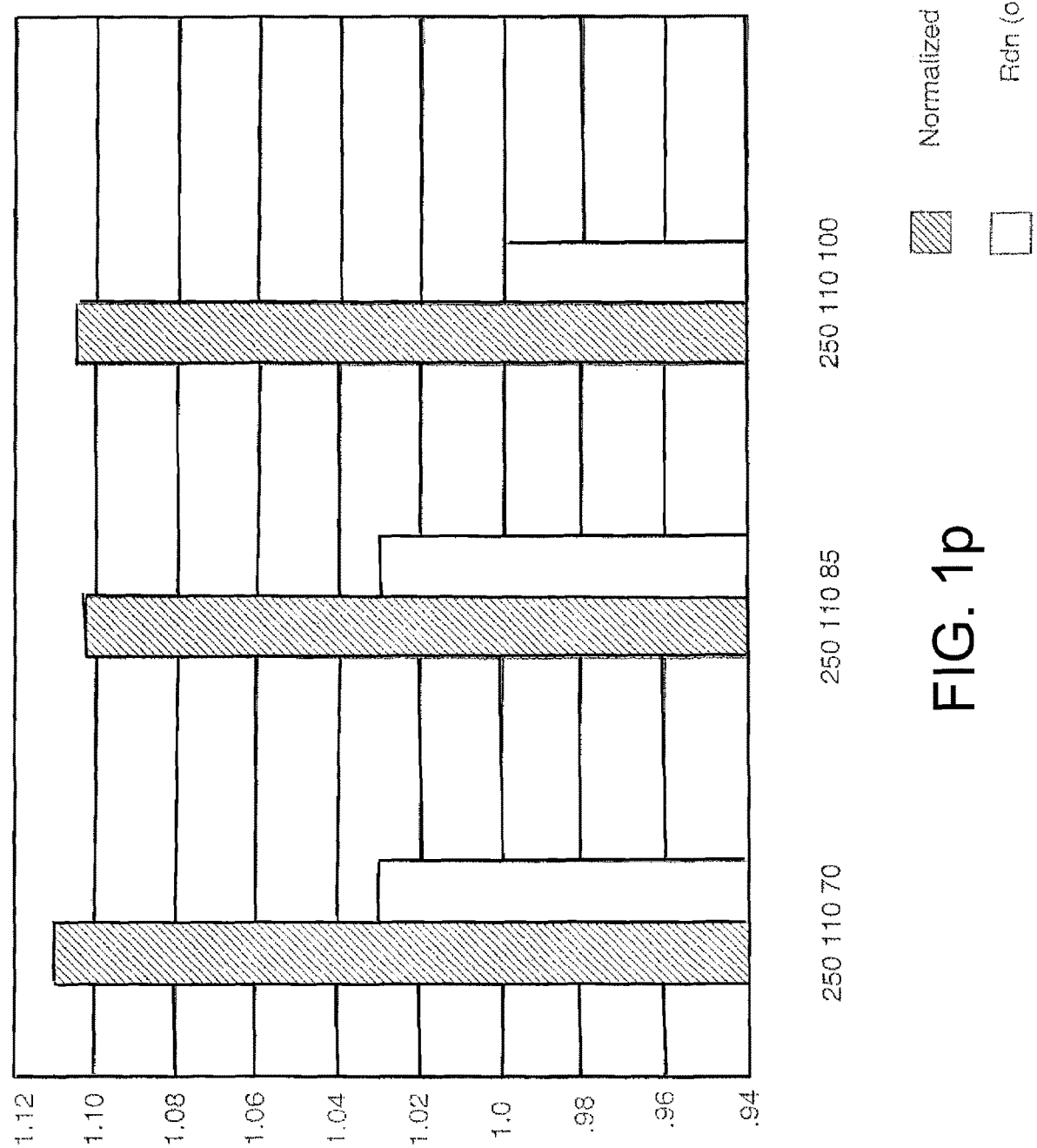
FIG. 1p illustrates effect of variation in feed pressure on internal resistance of electrodes, and on the capacitance of double layer capacitors using such electrodes.

Additional data has been obtained relating $C_{up}$ and $R_{down}$ to further increases in the inject pressure. Here, the feed rate and the grind pressure were kept constant at 250 units and 110 psi, respectively, while the inject pressure during production was set to 70 psi, 85 psi, and 100 psi. Bar graphs in FIG. 1p illustrate these data. As can be seen from these graphs, the normalized capacitance $C_{up}$ was little changed with increasing inject pressure beyond a certain point, while electrode resistance displayed a drop of several percentage points when the inject pressure was increased from 85 psi to 100 psi. The inventors herein believe that increasing the inject pressure beyond 100 psi would further improve electrode performance, particularly by decreasing internal electrode resistance.

Although dry blending 18 and dry fibrillization step 20 have been discussed herein as two separate steps that utilize multiple apparatus, it is envisioned that steps 18 and 20 could be conducted in one step wherein one apparatus receives dry particles 12, 14, and/or 16 as separate streams to mix the particles and thereafter fibrillize the particles. Accordingly, it is understood that the embodiments herein should not be limited by steps 18 and 20, but by the claims that follow. Furthermore, the preceding paragraphs describe in considerable detail inventive methods for dry fibrillizing carbon and binder mixtures to fabricate dry films, however, neither the specific embodiments of the invention as a whole, nor those of its individual features should limit the general principles described herein, which should be limited only by the claims that follow.

It is identified that, in order to form a self supporting dry film with adequate physical as well as electrical properties for use in a capacitor as described further herein, sufficiently high shear forces are needed. In contrast to the additive-based prior art fibrillization steps, the present invention provides such shear forces without using processing aides or additives. Furthermore, with the present invention no additives are used before, during, or after application of the shear forces. Numerous benefits derive from non-use of prior art additives including: reduction of process steps and processing apparatus, increase in throughput and performance, the elimination or substantial reduction of residue and impurities that can derive from the use of additives and additive-based process steps, as well as other benefits that are discussed or that can be understood by those skilled in the art from the description of the embodiments that follows.

Referring back to FIG. 1a, the illustrated process also includes steps 21 and 23, wherein dry conductive particles 21 and dry binder 23 are blended in a dry blend step 19. Step 19, as well as added step 26, also do not utilize additives before, during, or after the steps. In one embodiment, dry conductive particles 21 comprise conductive carbon particles. In one embodiment, dry conductive particles 21 comprise conductive graphite particles. In one embodiment, it is envisioned that conductive particles may comprise a metal powder of the like. In one embodiment, dry binder 23 comprises a dry thermoplastic material. In one embodiment, the dry binder comprises non-fibrillizable fluoropolymer. In one embodiment, dry binder 23 comprises polyethylene particles. In one embodiment, dry binder 23 comprises polypropylene or polypropylene oxide particles. In one embodiment, the thermoplastic material is selected from polyolefin classes of thermoplastic known to those skilled in the art. Other thermoplastics of interest and envisioned for potential use include homo and copolymers, olefinic oxides, rubbers, butadiene rubbers, nitrile rubbers, polyisobutylene, poly(vinylesters), poly(vinylacetates), polyacrylate, fluorocarbon polymers, with a choice of thermoplastic dictated by its melting point, metal adhesion, and electrochemical and solvent stability in the presence of a subsequently used electrolyte. In other embodiments, thermoset and/or radiation set type binders are envisioned as being useful. The present invention, therefore, should not be limited by the disclosed and suggested binders, but only by the claims that follow.

As has been stated, a deficiency in the additive-based prior art is that residues of additive, impurities, and the like remain, even after one or more long drying step(s). The existence of such residues is undesirable for long-term reliability when a subsequent electrolyte impregnation step is performed to activate an energy storage device electrode. For example, when an acetonitrile-based electrolyte is used, chemical and/or electrochemical interactions between the acetonitrile and residues and impurities can cause undesired destructive chemical processes in, and/or a swelling of, an energy storage device electrode. Other electrolytes of interest include carbonate-based electrolytes (ethylene carbonate, propylene carbonate, dimethylcarbonate), alkaline (KOH, NaOH), or acidic (H2SO4) water solutions. It is identified when processing additives are substantially reduced or eliminated from the manufacture of energy storage device structures, as with one or more of the embodiments disclosed herein, the prior art undesired destructive chemical and/or electrochemical processes and swelling caused by the interactions of residues and impurities with electrolyte are substantially reduced or eliminated.

In one embodiment, dry carbon particles 21 and dry binder particles 23 are used in a ratio of about 40%-60% binder to about 40%-60% conductive carbon by weight. In step 19, dry carbon particles 21 and dry binder material 23 are dry blended in a V-blender for about 5 minutes. In one embodiment, the conductive carbon particles 21 comprise a mean diameter of about 10 microns. In one embodiment, the binder particles 23 comprise a mean diameter of about 10 microns or less. Other particle sizes are also within the scope of the invention, and should be limited only by the scope of the claims. In one embodiment, (further disclosed by FIG. 2a), the blend of dry particles provided in step 19 is used in a dry feed step 22. In one embodiment (further disclosed by FIG. 2g), the blend of dry particles in step 19 may be used in a dry feed step 29, instead of dry feed step 22. In order to improve suspension and characteristics of particles provided by container 19, a small amount of fibrillizable binder (for example binder 16) may be introduced into the mix of the dry carbon particles 21 and dry binder particles 23, and dry fibrillized in an added dry fibrillization step 26 prior to a respective dry feed step 22 or 29.

Referring now to FIG. 2a, and preceding Figures as needed, there is seen one or more apparatus used for forming one or more energy device structure. In one embodiment, in step 22, the respective separate mixtures of dry particles formed in steps 19 and 20 are provided to respective containers 19 and 20. In one embodiment, dry particles from container 19 are provided in a ratio of about 1 gram to about 100 grams for every 1000 grams of dry particles provided by container 20. The containers are positioned above a device 41 of a variety used by those skilled in the art to compact and/or calender materials into sheets. The compacting and/or calendering function provided by device 41 can be achieved by a roll-mill, calender, a belt press, a flat plate press, and the like, as well as others known to those skilled in the art. Thus, although shown in a particular configuration, those skilled in the art will understand that variations and other embodiments of device 41 could be provided to achieve one or more of the benefits and advantages described herein, which should be limited only by the claims that follow.

Figure 2B:
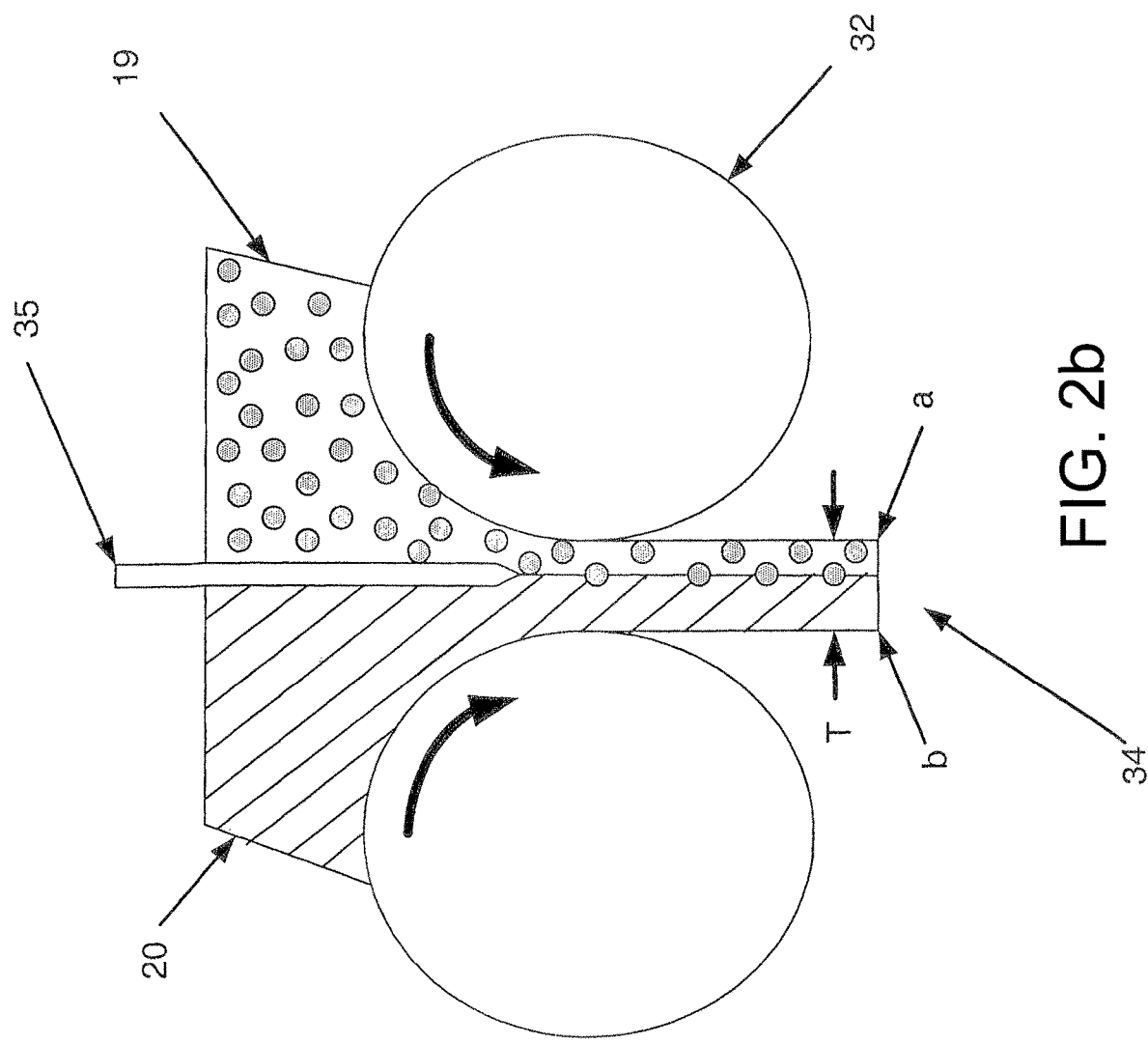
FIG. 2b shows a degree of intermixing of dry particles.

Referring now to FIG. 2b, and preceding Figures as needed, there is seen an apparatus used for forming one or more electrode structure. As shown in FIG. 2b, the dry particles in containers 19 and 20 are fed as free flowing dry particles to a high-pressure nip of a roll-mill 32. As they are fed towards the nip, the separate streams of dry particles become intermixed and begin to loose their freedom of motion. It is identified that use of relatively small particles in one or more of the embodiments disclosed herein enables that good particle mixing and high packing densities can be achieved and that a concomitant lower resistivity may be achieved as a result. The degree of intermixing can be to an extent determined by process requirements and accordingly made adjustments. For example, a separating blade 35 can be adjusted in both a vertical and/or a horizontal direction to change a degree of desired intermixing between the streams of dry particles. The speed of rotation of each roll may be different or the same as determined by process requirements. A resulting intermixed compacted dry film 34 exits from the roll-mill 32 and is self-supporting after only one compacting pass through the roll-mill 32. The ability to provide a self supporting film in one pass eliminates numerous folding steps and multiple compacting/calendering steps that in prior art embodiments are used to strengthen films to give them the tensile strength needed for subsequent handling and processing. Because the intermixed dry film 34 can be sufficiently self supporting after one pass through roll-mill 32, it can easily and quickly be formed into one long integral continuous sheet, which can be rolled for subsequent use in a commercial scale manufacture process. The dry film 34 can be formed as a self-supporting sheet that is limited in length only by the capacity of the rewinding equipment. In one embodiment, the dry film is between 0.1 and 5000 meters long. Compared to some prior art additive based films which are described as non-self supporting and/or small finite area films, the dry self-supporting films described herein are more economically suited for large scale commercial manufacture.

Referring now to FIG. 2c, and preceding Figures as needed, there is seen a diagram representing the degree of intermixing that occurs between particles from containers 19 and 20. In FIG. 2c, a cross section of intermixed dry particles at the point of application to the high-pressure nip of roll-mill 32 is represented, with "T" being an overall thickness of the intermixed dry film 34 at a point of exit from the high-pressure nip. The curve in FIG. 2c represents the relative concentration/amount of a particular dry particle at a given thickness of the dry film 34, as measured from a right side of the dry film 34 in FIG. 2b (y-axis thickness is thickness of film, and x-axis is relative concentration/amount of a particular dry particle). For example, at a given thickness measured from the right side of the dry film 34, the amount of a type of dry particle from container 19 (as a percentage of the total intermixed dry particles that generally exists at a particular thickness) can be represented by an X-axis value "I". As illustrated, at a zero thickness of the dry film 34 (represented at zero height along the Y-axis), the percentage of dry binder particles "I" from container 19 will be at a maximum, and at a thickness approaching "T", the percentage of dry particles from container 19 will approach zero.

Referring now to FIG. 2d, and preceding Figures as needed, there is seen a diagram illustrating a distribution of the sizes of dry binder and carbon particles. In one embodiment, the size distribution of dry binder and carbon particles provided by container 19 may be represented by a curve with a centralized peak, with the peak of the curve representing a peak quantity of dry particles with a particular particle size, and the sides of the peak representing lesser amounts of dry particles with lesser and greater particle sizes. In dry compacting/calendering step 24, the intermixed dry particles provided by step 22 are compacted by the roll-mill 32 to form the dry film 34 into an intermixed dry film. In one embodiment, the dry particles from container 19 are intermixed within a particular thickness of the resulting dry film 34 such that at any given distance within the thickness, the size distribution of the dry particles 19 is the same or similar to that existing prior to application of the dry particles to the roll-mill 32 (i.e. as illustrated by FIG. 2d). A similar type of intermixing of the dry particles from container 20 also occurs within the dry film 34 (not shown).

In one embodiment, the process described by FIGS. 2a-d is performed at an operating temperature, wherein the temperature can vary according to the type of dry binder selected for use in steps 16 and 23, but such that the temperature is less than the melting point of the dry binder 23 and/or is sufficient to soften the dry binder 16. In one embodiment, it is identified that when dry binder particles 23 with a melting point of 150 degrees are used in step 23, the operating temperature at the roll-mill 32 is about 100 degrees centigrade. In other embodiments, the dry binder in step 23 may be selected to comprise a melting point that varies within a range of about 50 degrees centigrade and about 350 degrees centigrade, with appropriate changes made to the operating temperature at the nip.

The resulting dry film 34 can be separated from the roll-mill 32 using a doctor blade, or the edge of a thin strip of plastic or other separation material, including metal or paper. Once the leading edge of the dry film 34 is removed from the nip, the weight of the self-supporting dry film and film tension can act to separate the remaining exiting dry film 34 from the roll-mill 32. The self-supporting dry film 34 can be fed through a tension control system 36 into a calender 38. The calender 38 may further compact and densify the dry film 34. Additional calendering steps can be used to further reduce the dry film's thickness and to increase tensile strength. In one embodiment, dry film 34 comprises a calendered density of about 0.50 to 0.70 gm/cm$^3$.

Figure 2E:
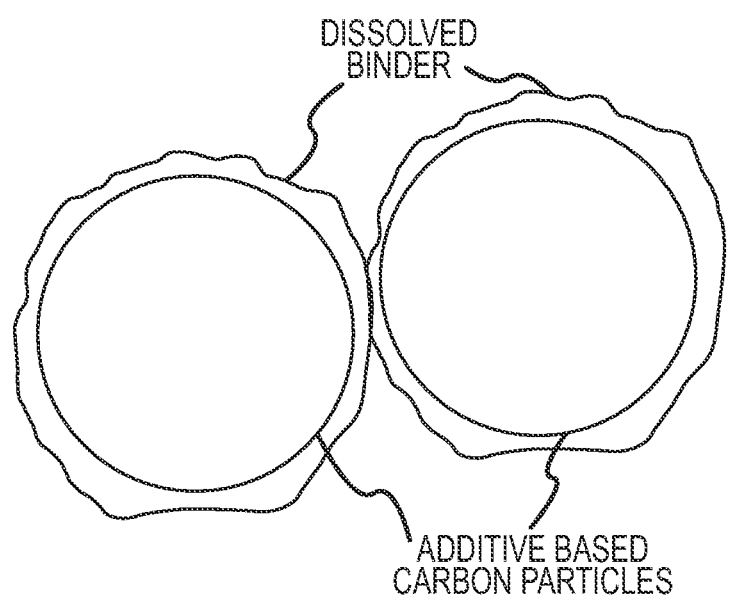
FIGS. 2e-f, show carbon particles as encapsulated by dissolved binder of the prior art and dry carbon particles as attached to dry binder of the present invention.
Figure 2F:
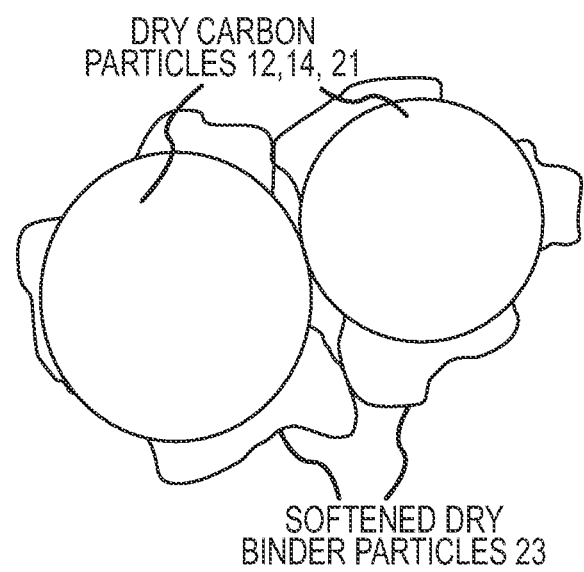

Referring now to FIGS. 2e-f, there are seen carbon particles encapsulated by dissolved binder of the prior art, and dry carbon particles attached to dry binder of the present invention, respectively. In the prior art, capillary type forces caused by the presence of solvents diffuse dissolved binder particles in a wet slurry based adhesive/binder layer into an attached additive-based electrode film layer. In the prior art, carbon particles within the electrode layer become completely encapsulated by the diffused dissolved binder, which when dried couples the adhesive/binder and electrode film layers together. Subsequent drying of the solvent results in an interface between the two layers whereat carbon particles within the electrode layer are prevented by the encapsulating binder from conducting, thereby undesirably causing an increased interfacial resistance. In the prior art, the extent to which binder particles from the adhesive/binder layer are present within the electrode film layer becomes limited by the size of the particles comprising each layer, for example, as when relatively large particles comprising the wet adhesive/binder layer are blocked from diffusing into tightly compacted particles of the attached additive-based electrode film layer.

In contrast to the prior art, particles from containers 19 and 20 are become intermixed within dry film 34 such that each can be identified to exist within a thickness "T" of the dry film with a particular concentration gradient. One concentration gradient associated with particles from container 19 is at a maximum at the right side of the intermixed dry film 34 and decreases when measured towards the left side of the intermixed dry film 34, and a second concentration gradient associated with particles from container 20 is at a maximum at the left side of the intermixed dry film 34 and decreases when measured towards the right side of the intermixed dry film 34. The opposing gradients of particles provided by container 19 and 20 overlap such that functionality provided by separate layers of the prior art may be provided by one dry film 34 of the present invention. In one embodiment, a gradient associated with particles from container 20 provides functionality similar to that of a separate prior art additive based electrode film layer, and the gradient associated with particles from container 19 provides functionality similar to that of a separate prior art additive based adhesive/binder layer. The present invention enables that equal distributions of all particle sizes can be smoothly intermixed (i.e. form a smooth gradient) within the intermixed dry film 34. It is understood that with appropriate adjustments to blade 35, the gradient of dry particles 19 within the dry film 34 can be made to penetrate across the entire thickness of the dry film, or to penetrate to only within a certain thickness of the dry film. In one embodiment, the penetration of the gradient of dry particles 19 is about 5 to 15 microns. In part, due to the gradient of dry particles 19 that can be created within dry film 34 by the aforementioned intermixing, it is identified that a lesser amount of dry particles need be utilized to provide a surface of the dry film with a particular adhesive property, than if dry particles 19 and dry particles 20 were pre-mixed throughout the dry film.

In the prior art, subsequent application of electrolyte to an additive based two-layer adhesive/binder and electrode film combination may cause the binder, additive residues, and impurities within the layers to dissolve and, thus, the two-layers to eventually degrade and/or delaminate. In contrast, because the binder particles of the present invention are distributed evenly within the dry film according to their gradient, and/or because no additives are used, and/or because the binder particles may be selected to be substantially impervious, insoluble, and/or inert to a wide class of additives and/or electrolyte, such destructive delamination and degradation can be substantially reduced or eliminated.

The present invention provides one intermixed dry film 34 such that the smooth transitions of the overlapping gradients of intermixed particles provided by containers 19 and 20 allow that minimized interfacial resistance is created. Because the dry binder particles 23 are not subject to and/or do not dissolve during intermixing, they do not completely encapsulate particles 12, 14, and 21. Rather, as shown in FIG. 2f, after compacting, and/or calendaring, and/or heating steps, dry binder particles 23 become softened sufficiently such that they attach themselves to particles 12, 14, and 21. Because the dry binder particles 23 are not completely dissolved as occurs in the prior art, the particles 23 become attached in a manner that leaves a certain amount of surface area of the particles 12, 14, and 21 exposed; an exposed surface area of a dry conductive particle can therefore make direct contact with surface areas of other conductive particles. Because direct conductive particle-to-particle contact is not substantially impeded by use of dry binder particles 23, an improved interfacial resistance over that of the prior art binder encapsulated conductive particles can be achieved.

Figure 3:
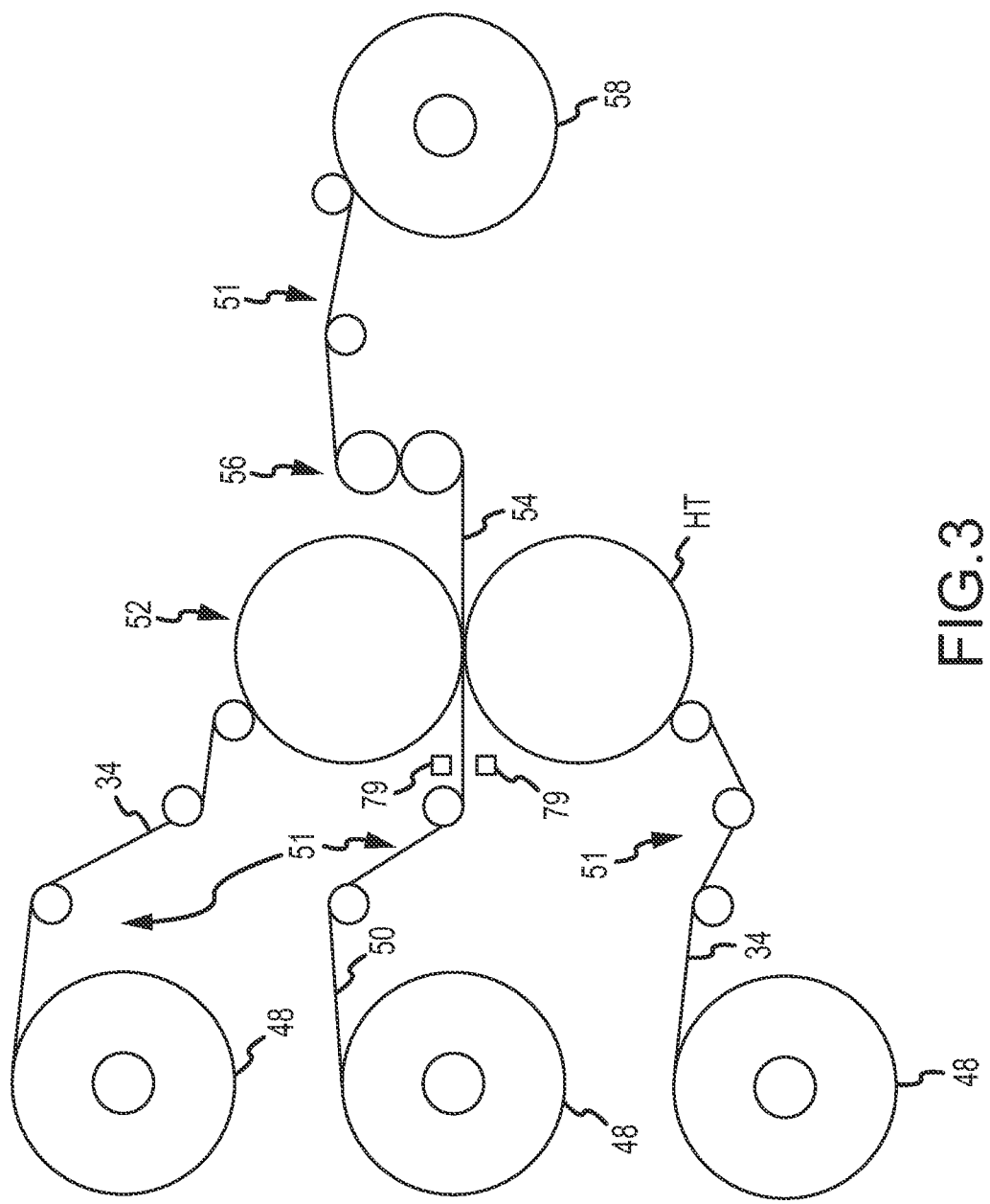
FIG. 3 is a side representation of one embodiment of a system for bonding electrode films to a current collector for use in an energy storage device.

The intermixed dry film 34 also exhibits dissimilar and asymmetric surface properties at opposing surfaces, which contrasts to the prior art, wherein similar surface properties exist at opposing sides of each of the separate adhesive/binder and electrode layers. The asymmetric surface properties of dry film 34 may be used to facilitate improved bonding and electrical contact to a subsequently used current collector (FIG. 3 below). For example, when bonded to a current collector, the one dry film 34 of the present invention introduces only one distinct interface between the current collector and the dry film 34, which contrasts to the prior art, wherein a distinct first interfacial resistance boundary exists between a collector and additive based adhesive/binder layer interface, and wherein a second distinct interfacial resistance boundary exists between an additive-based adhesive/binder layer and additive-based electrode layer interface.

Figure 2G:
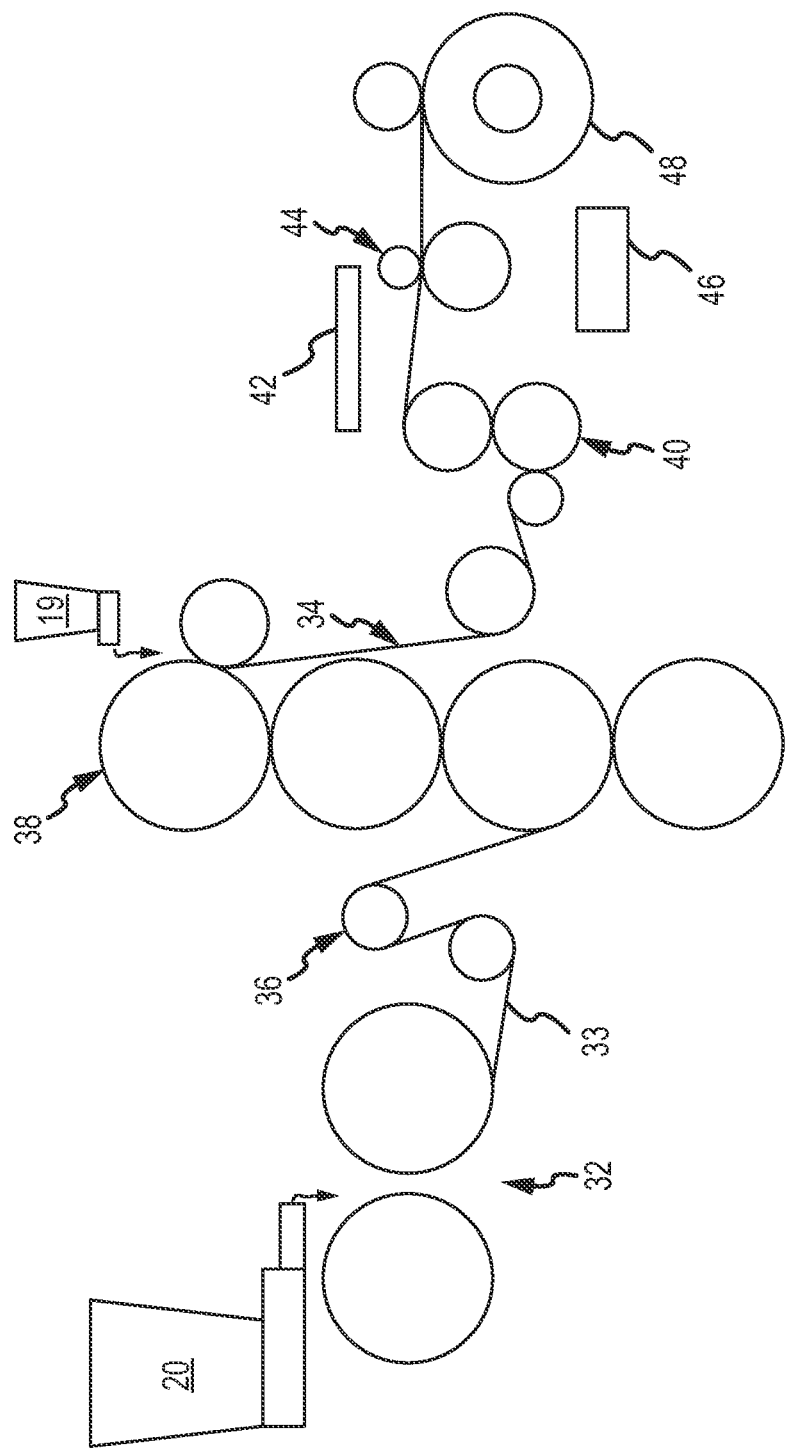
FIG. 2g shows a system for forming a structure for use in an energy storage device.

Referring now to FIG. 2g, and preceding Figures as needed, there is seen one or more apparatus used for the manufacture of one or more structure described herein. FIG. 2g illustrates apparatus similar to that of FIG. 2a, except that container 19 is positioned downstream from container 20. In one embodiment, in a step 29, the dry particles provided by container 19 are fed towards a high-pressure nip 38. By providing dry particles from steps 19 and 20 at two different points in a calender apparatus, it is identified that the temperature at each step of the process may be controlled to take into account different softening/melting points of dry particles that may be provided by steps 19 and 20.

In FIG. 2g, container 19 is disposed to provide dry particles 19 onto a dry film 33. In FIG. 2g, container 20 comprises dry particles 12, 14, and 16, which are dry fibrillized and provided in accordance with principles described above. A dry free flowing mixture from container 20 may be compacted to provide the dry film 33 to be self-supporting after one pass through a compacting apparatus, for example roll-mill 32. The self-supporting continuous dry film 33 can be stored and rolled for later use as an energy device electrode film, or may be used in combination with dry particles provided by container 19. For example, as in FIG. 2g, dry adhesive/binder particles comprising a free flowing mixture of dry conductive carbon 21 and dry binder 23 from container 19 may be fed towards dry film 33. In one embodiment, scatter coating equipment similar to that used in textile and non-woven fabric industries is contemplated for dispersion of the dry particles onto dry film 33. In one embodiment, the dry film 33 is formed from dry particles 12, 14, and 16 as provided by container 20. The dry particles from container 19 may be compacted and/or calendared against and within the dry film 33 to form a subsequent dry film 34, wherein the dry particles are embedded and intermixed within the dry film 34. Through choice of location of containers 19 and 20, powder feed-rate, separating blade 35, roll speed ratios, and/or surface of rolls, it is identified that the interface between dry particles provided to form a dry particle based electrode film may be appropriately varied. An embedded/intermixed dry film 34 may be subsequently attached to a collector or wound onto a storage roll 48 for subsequent use.

Alternative means, methods, steps, and setups to those disclosed herein are also within the scope of the present invention and should be limited only by the appended claims and their equivalents. For example, in one embodiment, instead of the self supporting continuous dry film 33 described herein, a commercially available prior art additive-based electrode film could be provided for subsequent calendering together with dry particles provided by the container 19 of FIG. 2g. Although a resulting two-layer film made in this manner would be at least in part additive based, and could undesirably interact with subsequently used electrolyte, such a two-layer film would nevertheless not need to utilize, or be subject to the limitations associated with, a prior art slurry based adhesive/binder layer. In one embodiment, instead of the continuous dry film 33 of FIG. 2g, a heated collector (not shown) could be provided, against which dry particles from container 19 could calendered. Such a combination of collector and adhered dry particles from container 19 could be stored and provided for later attachment to a separately provided electrode layer, which with appropriate apparatus could be heat calendered to attach the dry binder 23 in dry particles provided by container 19 to the collector.

Referring to FIG. 3, and preceding Figures as needed, there is seen an apparatus used to bond a dry film to a current collector. In step 28, a dry film 34 is bonded to a current collector 50. In one embodiment, the current collector comprises an etched or roughened aluminum sheet, foil, mesh, screen, porous substrate, or the like. In one embodiment, the current collector comprises a metal, for example, copper, aluminum, silver, gold, and the like. In one embodiment, current collector comprises a thickness of about 30 microns. Those skilled in the art will recognize that if the electrochemical potential allows, other metals could also be used as a collector 50.

In one embodiment, a current collector 50 and two dry film(s) 34 are fed from storage rolls 48 into a heated roll-mill 52 such that the current collector 50 is positioned between two self-supporting dry films 34. In one embodiment, the current collector 50 may be pre-heated by a heater 79. The temperature of the heated roll-mill 52 may be used to heat and soften the dry binder 23 within the two intermixed dry films 34 such that good adhesion of the dry films to the collector 50 is effectuated. In one embodiment, a roll-mill 52 temperature of at the nip of the roll is between 100° C. and 300° C. In one embodiment, the nip pressure is selected between 50 pounds per linear inch (PLI) and 1000 PLI. Each intermixed dry film 34 becomes calendared and bonded to a side of the current collector 50. The two dry intermixed films 34 are fed into the hot roll nip 52 from storage roll(s) 48 in a manner that positions the peak of the gradients formed by the dry particles from container 19 directly against the current collector 50 (i.e. right side of a dry film 34 illustrated in FIG. 2b). After exiting the hot roll nip 52, it is identified that the resulting calendared dry film and collector product can be provided as a dry electrode 54 for use in an energy storage device, for example, as a double-layer capacitor electrode. In one embodiment, the dry electrode 54 can be S-wrapped over chill rolls 56 to set the dry film 34 onto the collector 50. The resulting dry electrode 54 can then be collected onto another storage roll 58. Tension control systems 51 can also be employed by the system shown in FIG. 3.

Other means, methods, and setups for bonding of films to a current collector 50 can be used to form energy storage device electrodes, which should be limited only by the claims. For example, in one embodiment (not shown), a film comprised of a combination of a prior art additive-based electrode layer and embedded dry particles from a container 19 could be bonded to a current collector 50.

Figure 4:
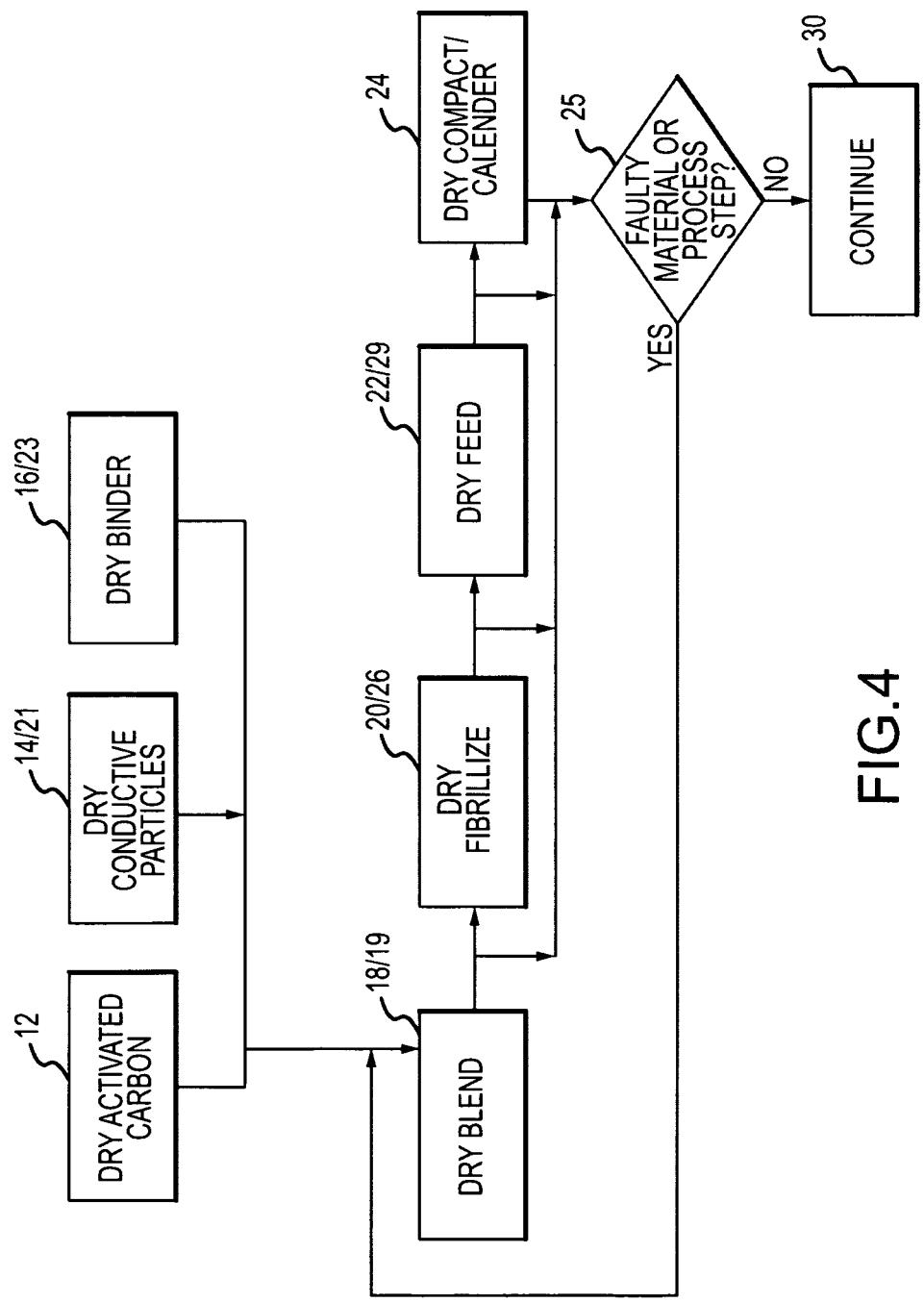
FIG. 4 illustrates a method for recycling/reusing dry particles and structures made therefrom.

Referring to FIG. 4, and preceding Figures as needed, there is seen a block diagram illustrating a method for reusing/recycling dry particles and structures made therefrom. It has been identified that problems may arise during one or more of the process steps described herein, for example, if various process parameters vary outside a desired specification during a process step. It is identified, according to embodiments described further herein, that dry particles 12, 14, 16, 21, 23, dry films 33 and 34, and one or more structures formed therefrom may be reused/recycled despite such problems arise, if so desired or needed. Because of use of additives, prior art process are unable provide such reuse/recycle process steps. In general, because one or more of the embodiments described herein do not utilize processing additives, the properties of the dry particles 12, 14, 16, 21, and/or 23 are not adversely altered ensuing process steps. Because solvent, lubricants, or other liquids are not used, impurities and residues associated therewith do not degrade the quality of the dry particles 12, 14, 16, 21, and/or 23, allowing the particles to be reused one or more times. Because minimal or nor drying times are needed, dry particles 12, 14, 16, 21, and/or 23 may be reused quickly without adversely affecting throughput of the dry process. Compared against the prior art, it has been identified that the dry particles and/or dry structures formed therefrom may be reused/recycled such that overall process yield and cost can be reduced without affecting overall quality.

It is identified that dry particles 12, 14, 16, 21, and/or 23 may be reused/recycled after being processed by a particular dry process step 19, 20, 22, 24, 26, 28, and/or 29. For example, in one embodiment, after dry process step 18 or 20, if it is determined that a defect in dry particles 12, 14, 16, and/or a structure formed therefrom is present, the resulting material may be collected in a dry process step 25 for reuse or recycling. In one embodiment, dry particles 12, 14, and 16 may be returned and reprocessed without addition of any other dry particles, or may be returned and added to fresh new additional particles 12, 14, and/or 16. Dry particles provided for recycling by step 25 may be reblended by dry blend step 18, and further processed according to one or more embodiments described herein. In one embodiment, a dry film 33 comprised of dry particles 12, 14, and 16 as described above in FIG. 2g, and provided as a self-supporting film 33 by step 24, may be recycled in step 25. In one embodiment, after dry process step 19, 26, or 29, if it is determined that a defect in dry particles 21, 23, or a structure formed therefrom is present, the resulting material may be collected in a dry process step 25 and returned for recycling. In one embodiment, dry particles 21 and 23 may be returned and reprocessed without addition of any other dry particles, or may be returned and added to fresh additional particles 21 or 23. Dry particles provided for recycling by step 25 may be reblended by dry blend step 19, and further processed according to one or more embodiments described herein. In one embodiment, dry particles 12, 14, 16, 21, and 23 as provided as a self-supporting film 34 by step 24 may be recycled in step 25. Prior to reuse, the dry film 33 or 34 can be sliced, chopped, or other wise be reduced in size so as to be more easily blended, by itself, or in combination with additional new dry particles 12, 14, 16, 21, and/or 23.

If after bonding dry film 34 to a collector, a defect in the resulting electrode is found, it is envisioned that the combination of dry film and bonded collector could also be sliced chopped, or otherwise reduced in size so as to be easily blended. Because the collector may comprise a conductor, it is envisioned that the collector portion of the recycled electrode could provide similar functionality to that provided by the dry conductive particles. It is envisioned that the recycled/reused dry film 34 and collector mixture could be used in combination with additional new dry particles 12, 14, 16, 21, and/or 23.

In one embodiment, it is envisioned that a certain percentage of dry reused/recycled dry material provided by step 25 could be mixed with a certain percentage of fresh dry particles 12, 14, 16, 21, and/or 23. In one embodiment a mix of fresh particles 12, 14, 16, 21, and/or 23; and dry reused/recycled material resulting from step 25 comprises a 50/50 mix. Other mixtures of new and old dry structures are also within the scope of the invention. In one embodiment, over all particle percentages by weight, after recycle/reuse steps described herein, may comprise percentages previously described herein, or other percentages as needed. In contrast to embodiments of intermixed film 34 discussed above, those skilled in the art will identify that a dry film 34 comprising one or more recycled structures may, (depending on what particular point a recycle/use step was performed), comprise a dry film with less, or even no, particle distribution gradients (i.e. an evenly intermixed dry film).

Figure 5A:
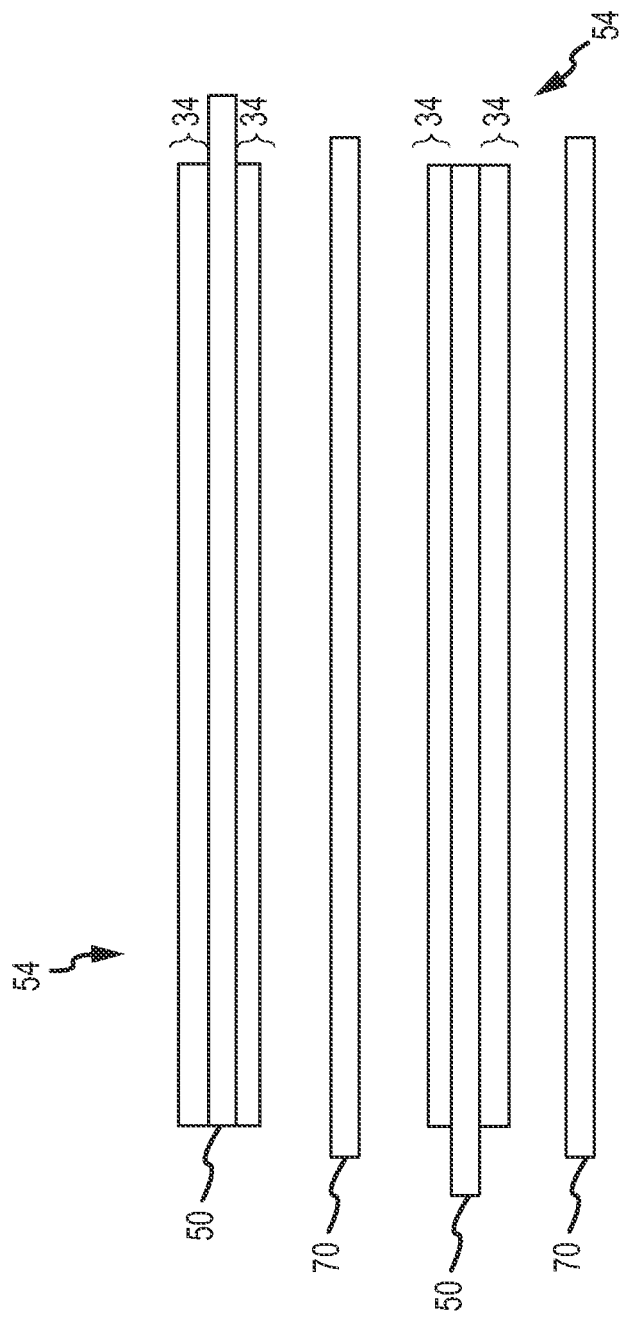
FIG. 5a is a side representation of one embodiment of a structure of an energy storage device electrode.
Figure 5B:
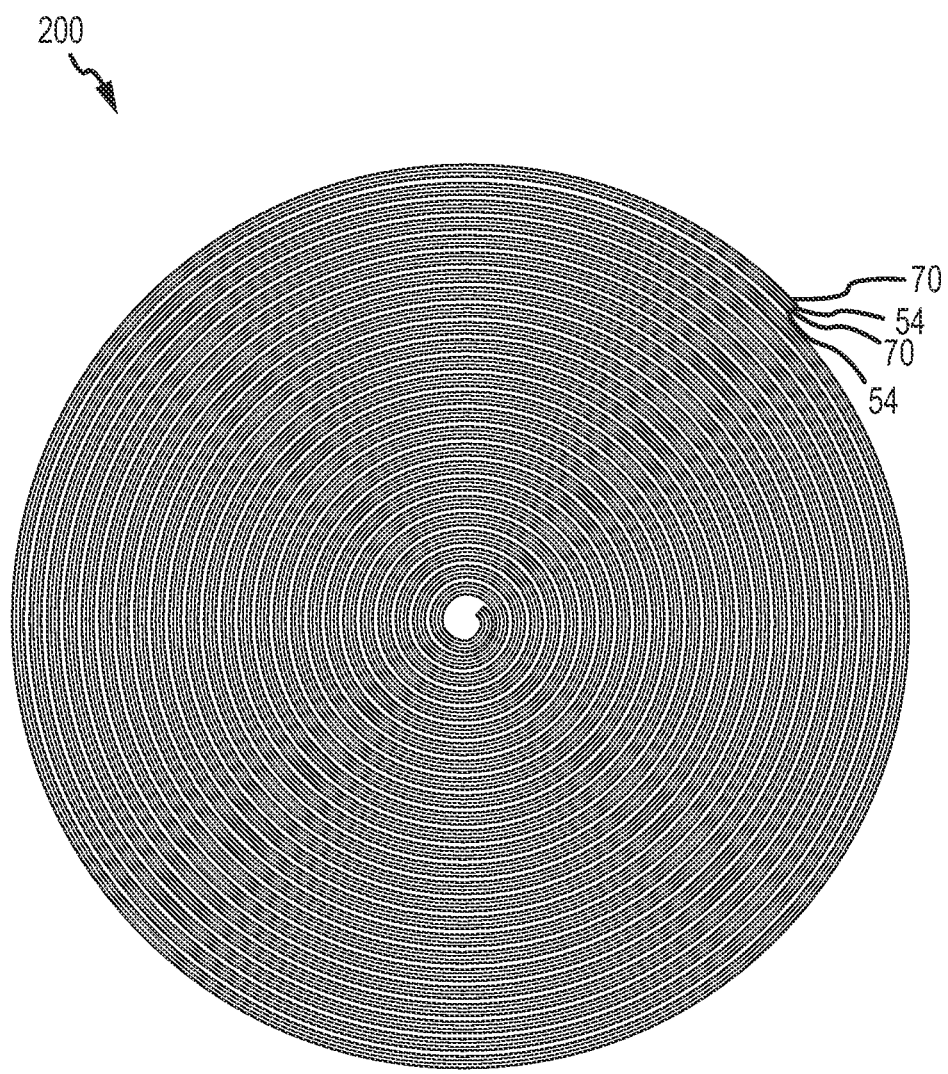
FIG. 5b is a top representation of one embodiment of an electrode.

Referring now to FIGS. 5a and 5b, and preceding Figures as needed, there are seen structures of an energy storage device. In FIG. 5a, there are shown cross-sections of four intermixed dry films 34, which are bonded to a respective current collector 50 according to one or more embodiments described previously herein. First surfaces of each of the dry films 34 are coupled to a respective current collector 50 in a configuration that is shown as a top dry electrode 54 and a bottom dry electrode 54. According to one or more of the embodiments discussed previously herein, the top and bottom dry electrodes 54 are formed from a blend of dry particles without use of any additives. In one embodiment, the top and bottom dry electrodes 54 are separated by a separator 70. In one embodiment, separator 70 comprises a porous paper sheet of about 30 microns in thickness. Extending ends of respective current collectors 50 are used to provide a point at which electrical contact can be effectuated. In one embodiment, the two dry electrodes 54 and separators 70 are subsequently rolled together in an offset manner that allows an exposed end of a respective collector 50 of the top electrode 54 to extend in one direction and an exposed end of a collector 50 of the bottom electrode 54 to extend in a second direction. The resulting geometry is known to those skilled in the art as a jellyroll and is illustrated in a top view by FIG. 5b.

Referring now to FIG. 5b, and preceding Figures as needed, first and second electrodes 54, and two separators 70 are rolled about a central axis to form a rolled energy storage device electrode 200. In one embodiment, the electrode 200 comprises two dry films 34, each dry film comprising a width and a length. In one embodiment, one square meter of a 150 micron thick dry film 34 weighs about 0.1 kilogram. In one embodiment, the dry films 34 comprise a thickness of about 80 to 260 microns. In one embodiment, a width of the dry films comprises between about 10 to 300 mm. In one embodiment, a length is about 0.1 to 5000 meters and the width is between 30 and 150 mm. Other particular dimensions may be may be determined by a required final energy storage device storage parameter. In one embodiment, the storage parameter includes values between 1 and 5000 Farads. With appropriate changes and adjustments, other dry film 34 dimensions and other capacitance are within the scope of the invention. Those skilled in the art will understand that offset exposed current collectors 50 (shown in FIG. 5a) extend from the roll, such that one collector extends from one end of the roll in one direction and another collector extends from an end of the roll in another direction. In one embodiment, the collectors 50 may be used to make electric contact with internal opposing ends of a sealed housing, which can include corresponding external terminals at each opposing end for completing an electrical contact.

Figure 6:
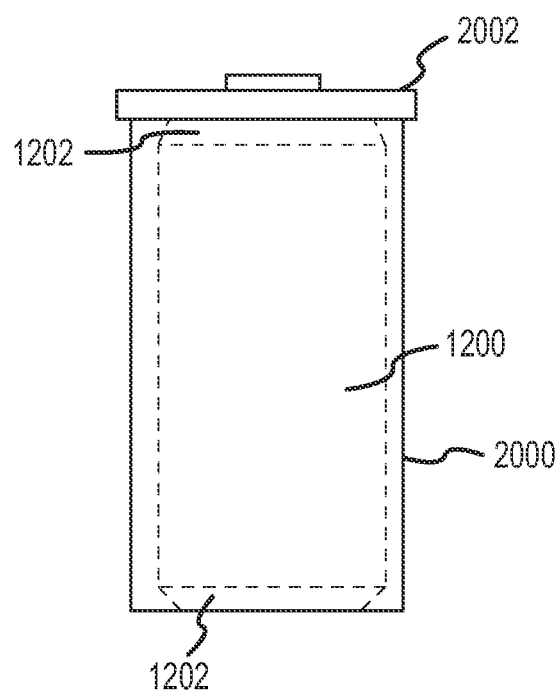
FIG. 6 is a side representation of a rolled electrode coupled internally to a housing.

Referring now to FIG. 6, and preceding Figures as needed, during manufacture, a rolled electrode 1200 made according to one or more of the embodiments disclosed herein is inserted into an open end of a housing 2000. An insulator (not shown) is placed along a top periphery of the housing 2000 at the open end, and a cover 2002 is placed on the insulator. During manufacture, the housing 2000, insulator, and cover 2002 may be mechanically curled together to form a tight fit around the periphery of the now sealed end of the housing, which after the curling process is electrically insulated from the cover by the insulator. When disposed in the housing 2000, respective exposed collector extensions 1202 of electrode 1200 make internal contact with the bottom end of the housing 2000 and the cover 2002. In one embodiment, external surfaces of the housing 2000 or cover 2002 may include or be coupled to standardized connections/connectors/terminals to facilitate electrical connection to the rolled electrode 1200 within the housing 2000. Contact between respective collector extensions 1202 and the internal surfaces of the housing 2000 and the cover 2002 may be enhanced by welding, soldering, brazing, conductive adhesive, or the like. In one embodiment, a welding process may be applied to the housing and cover by an externally applied laser welding process. In one embodiment, the housing 2000, cover 2002, and collector extensions 1202 comprise substantially the same metal, for example, aluminum. An electrolyte can be added through a filling/sealing port (not shown) to the sealed housing 1200. In one embodiment, the electrolyte is 1.5 M tetramethylammonium or tetrafluoroborate in acetonitrile solvent. After impregnation and sealing, a finished product is thus made ready for commercial sale and subsequent use.

Although the particular systems and methods herein shown and described in detail are capable of attaining the above described objects of the invention, it is understood that the description and drawings presented herein represent some, but not all, embodiments that are broadly contemplated. Structures and methods that are disclosed may thus comprise configurations, variations, and dimensions other than those disclosed. For example, other classes of energy storage devices that utilize electrodes and adhesives as described herein are within the scope of the present invention, including batteries and fuel cells. Also, different housings may comprise coin-cell type, clamshell type, prismatic, cylindrical type geometries, as well as others as are known to those skilled in the art. For a particular type of housing, it is understood that appropriate changes to electrode geometry may be required, but that such changes would be within the scope of those skilled in the art. It is also contemplated that an energy storage device made according to dry principles described herein may comprise two different electrode films that differ in compositions and/or dimensions (i.e. asymmetric electrodes). Additionally, it is contemplated that principles disclosed herein could be utilized in combination with a carbon cloth type electrode. Thus, the scope of the present invention fully encompasses other embodiments that may become obvious to those skilled in the art and that the scope of the present invention is accordingly limited by nothing other than the appended claims and their equivalents.

What is claimed is:

1. A dry method of making an energy storage device electrode film, the dry method comprising:
    forming a first dry electrode film from a first plurality of dry particles, wherein no solvents are used for forming the first dry electrode film, wherein the first dry electrode film consists of a fibrillizable fluoropolymer dry binder, activated carbon particles and conductive carbon particles, and wherein the first plurality of dry particles consist of a fibrillizable fluoropolymer dry binder, activated carbon particles, and conductive carbon particles; and
    recycling at least a portion of the first dry electrode film to form a second dry electrode film, wherein the recycling is a dry recycling process in which no solvents are used in any portion of the process, wherein the dry recycling process consists of:
    reducing in size the portion of the first dry electrode film to form a second plurality of homogeneous dry particles, wherein the second plurality of homogeneous dry particles consist of a free flowing powder of a fibrillizable fluoropolymer dry binder, activated carbon particles and conductive carbon particles; and
    calendering a composition, wherein the composition consists of the second plurality of homogeneous dry particles, to form the second dry electrode film;
    wherein calendering the second dry electrode film is performed directly after forming the second plurality of homogeneous dry particles; and
    wherein at least one of the first and second dry electrode films is self-supporting.

2. The dry method of claim 1, further comprising coupling a first side of the second dry electrode film to a collector.

3. The dry method of claim 1, wherein the fibrillizable fluoropolymer dry binder comprises polytetrafluoroethylene.

4. The dry method of claim 1, wherein the first dry electrode film is self-supporting.

5. The dry method of claim 1, wherein the second dry electrode film is self-supporting.

6. The dry method of claim 1, wherein the first and second dry electrode films are heated dry films.

7. The dry method of claim 1, wherein the second dry electrode film comprises a density of about 0.50 to 0.70 gm/cm3.

8. The dry method of claim 1, wherein the first dry electrode film comprises between about 80% to 95% activated carbon, between about 0% to 15% conductive carbon, and between about 3% to 15% fluoropolymer.

9. The dry method of claim 1, wherein the second dry electrode film comprises a length of at least one meter.

10. The dry method of claim 1, wherein the second dry electrode film comprises a self-supporting dry intermixed film structure.

11. The dry method of claim 1, wherein the second dry electrode film is both conductive and adhesive.

12. The dry method of claim 11, wherein the second dry electrode film is coupled directly to a current collector.

13. The dry method of claim 1, wherein the reducing step comprises one or more processing steps selected from the group consisting of dry fibrillizing, dry blending, and dry milling.

14. The dry method of claim 13, wherein the reducing step comprises jet-milling.

15. A method of making a battery comprising:
    making at least one energy storage device electrode using the method of claim 1;
    inserting the at least one energy storage device electrode into a housing;
    covering the housing with a cover; and
    adding electrolyte into the housing.

16. The dry method of claim 1, wherein calendering the second dry electrode film is performed within 10 minutes after forming the second plurality of homogeneous dry particles.

17. A dry method of making an energy storage device electrode film, the dry method comprising:
    forming a first dry electrode film solely from a first dry free flowing powder, wherein the first dry free flowing powder consists of fibrillizable fluoropolymer dry binder particles, dry activated carbon particles and dry conductive carbon particles; and
    recycling at least a portion of the first dry electrode film to form a second dry electrode film, wherein the recycling is a dry recycling process in which no solvents are used in any portion of the process, the dry recycling process consists of:
    collecting an unused portion of the first dry electrode film, wherein the unused portion of the first dry electrode film consists of fibrillizable fluoropolymer dry binder particles, dry activated carbon particles, and dry conductive carbon particles;
    reprocessing the unused portion of the first dry electrode film to form a second dry homogeneous free flowing powder, wherein the second dry homogeneous free flowing powder and the unused portion of the first electrode film consists of fibrillizable fluoropolymer dry binder particles, dry activated carbon particles, and dry conductive carbon particles; and calendering a composition, wherein the composition consists of the second dry homogeneous free flowing powder to form the second dry electrode film;

wherein calendering the second dry electrode film is performed directly after forming the second dry homogeneous free flowing powder; and wherein at least one of the first and second dry electrode films is self-supporting.

18. The dry method of claim 17, wherein the fibrillizable fluoropolymer dry binder particles comprise polytetrafluoroethylene.

19. The dry method of claim 17, further comprising coupling a first side of the second dry electrode film to a collector.

20. The dry method of claim 17, wherein the first dry electrode film is self-supporting.

21. The dry method of claim 17, wherein the second dry electrode film is self-supporting.

22. The dry method of claim 17 further comprising heating the first and second dry electrode films.

23. The dry method of claim 17, wherein the first dry electrode film comprises between about 80% to 95% activated carbon, between about 0% to 15% conductive carbon, and between about 3% to 15% fibrillizable fluoropolymer dry binder particles.

24. The dry method of claim 17, wherein the second dry electrode film comprises a self-supporting dry intermixed film structure.

25. The dry method of claim 17, wherein the second dry electrode film is both conductive and adhesive.

26. The dry method of claim 17, wherein reprocessing further comprises one or more processing steps selected from the group consisting of dry fibrillizing, dry blending and dry milling.

27. The dry method of claim 26, wherein the processing step comprises jet-milling.

28. A method of making a battery comprising making at least one energy storage device electrode using the method of claim 17;

inserting the at least one energy storage device electrode into a housing;

covering the housing with a cover; and adding electrolyte into the housing.

29. The dry method of claim 17, wherein calendering the second dry electrode film is performed within 10 minutes after forming the second dry homogeneous free flowing powder.

* * * * *